United States Patent
Jin

(10) Patent No.: US 10,432,632 B2
(45) Date of Patent: Oct. 1, 2019

(54) METHOD FOR ESTABLISHING NETWORK CONNECTION, GATEWAY, AND TERMINAL

(71) Applicant: HUAWEI TECHNOLOGIES CO., LTD., Shenzhen (CN)

(72) Inventor: Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 15/388,069

(22) Filed: Dec. 22, 2016

(65) Prior Publication Data

US 2017/0104758 A1 Apr. 13, 2017

Related U.S. Application Data

(63) Continuation of application No. PCT/CN2014/080751, filed on Jun. 25, 2014.

(51) Int. Cl.
*H04L 29/06* (2006.01)
*H04L 29/12* (2006.01)
(Continued)

(52) U.S. Cl.
CPC .......... *H04L 63/10* (2013.01); *H04L 61/2592* (2013.01); *H04L 63/08* (2013.01);
(Continued)

(58) Field of Classification Search
CPC ..... H04L 63/10; H04L 61/2592; H04L 63/08; H04W 48/18; H04W 12/06; H04W 76/10;
(Continued)

(56) References Cited

U.S. PATENT DOCUMENTS 9,843,996 B2 * 12/2017 Bergstrom ............ H04W 76/10
2006/0111082 A1 * 5/2006 Zhang .................... H04L 63/08
455/411
(Continued)

FOREIGN PATENT DOCUMENTS

| CN | 102355746 A | 2/2012 |
| CN | 103298148 A | 9/2013 |

(Continued)

OTHER PUBLICATIONS

International Search Report dated Mar. 27, 2015 in corresponding International Patent Application No. PCT/CN2014/080751.
(Continued)

*Primary Examiner* — Brandon S Hoffman
*Assistant Examiner* — William A Corum, Jr.
(74) *Attorney, Agent, or Firm* — Slater Matsil, LLP

(57) ABSTRACT

The present invention pertains to the field of Internet technologies, and discloses a method for establishing a network connection. The method includes: establishing a user plane connection to a terminal, where the terminal accesses a first WLAN; receiving, by using the established user plane connection, a connection selection request sent by the terminal, where the connection selection request includes connection selection information; determining, according to the connection selection information in the connection selection request, a service network selected by the terminal; and establishing a connection between the terminal and the service network selected by the terminal. In this way, the terminal can connect to different service networks, so that a network connection manner becomes more flexible, interaction between the terminal and a gateway is simplified, and a network connection range is expanded.

12 Claims, 18 Drawing Sheets

(51) Int. Cl.
*H04W 12/06* (2009.01)
*H04W 48/18* (2009.01)
*H04W 76/10* (2018.01)
*H04W 84/12* (2009.01)
*H04W 88/02* (2009.01)
*H04W 88/08* (2009.01)
*H04W 88/16* (2009.01)
*H04W 48/14* (2009.01)

(52) U.S. Cl.
CPC ........... *H04W 12/06* (2013.01); *H04W 48/18* (2013.01); *H04W 48/14* (2013.01); *H04W 76/10* (2018.02); *H04W 84/12* (2013.01); *H04W 88/02* (2013.01); *H04W 88/08* (2013.01); *H04W 88/16* (2013.01)

(58) Field of Classification Search
CPC ..... H04W 48/14; H04W 88/16; H04W 84/12; H04W 88/02; H04W 88/08
See application file for complete search history.

(56) References Cited

U.S. PATENT DOCUMENTS

| | | | | |
|---|---|---|---|---|
| 2006/0291448 A1* | 12/2006 | Hellgren | .............. | H04L 63/08 370/352 |
| 2008/0247346 A1 | 10/2008 | Gulbani et al. | | |
| 2010/0290448 A1* | 11/2010 | Rune | ..................... | H04W 48/18 370/338 |
| 2011/0300865 A1* | 12/2011 | Kashikar | ............... | H04W 48/18 455/435.2 |
| 2013/0064221 A1* | 3/2013 | Pampu | .............. | H04W 36/0033 370/331 |
| 2013/0265985 A1 | 10/2013 | Salkintzis | | |
| 2014/0024340 A1* | 1/2014 | Raleigh | ................. | H04M 15/00 455/406 |
| 2014/0153546 A1* | 6/2014 | Kim | ..................... | H04W 48/18 370/332 |
| 2014/0204903 A1* | 7/2014 | Kim | ..................... | H04W 48/18 370/331 |
| 2014/0328254 A1* | 11/2014 | Lim | .................. | H04W 36/0055 370/328 |
| 2015/0237543 A1* | 8/2015 | Montemurro | ..... | H04W 36/0061 455/436 |
| 2015/0256349 A1* | 9/2015 | Kim | ..................... | H04L 12/1407 370/259 |
| 2015/0350954 A1* | 12/2015 | Faccin | .................. | H04W 76/16 370/254 |
| 2015/0350989 A1* | 12/2015 | Himayat | ........... | H04W 36/0066 370/331 |
| 2016/0021605 A1* | 1/2016 | Kim | ....................... | H04W 48/18 370/328 |
| 2016/0174145 A1* | 6/2016 | Zee | ....................... | H04W 48/08 370/328 |
| 2016/0212667 A1* | 7/2016 | Kim | ....................... | H04W 48/18 |
| 2016/0278139 A1* | 9/2016 | Lei | ....................... | H04W 28/08 |
| 2016/0360476 A1* | 12/2016 | Kim | ....................... | H04W 48/16 |
| 2017/0188275 A1* | 6/2017 | Kim | ....................... | H04W 76/10 |
| 2017/0195930 A1* | 7/2017 | Tomici | .................... | H04W 8/06 |

FOREIGN PATENT DOCUMENTS

| | | |
|---|---|---|
| CN | 103379547 A | 10/2013 |
| EP | 2816863 A1 | 12/2014 |
| WO | 2010/037309 A1 | 4/2010 |
| WO | 2013131483 A1 | 9/2013 |
| WO | 2014/023337 A1 | 2/2014 |
| WO | 2014/040564 A1 | 3/2014 |

OTHER PUBLICATIONS

"Technical Specification Group Services and System Aspects; Architecture enhancements for non-3GPP accesses" Valbonne, France, 3GPP TS 23.402, Jun. 2014.
International Search Report dated Mar. 27, 2015 in corresponding Application No. PCT/CN2014/080751.
Extended European Search Report dated Jun. 20, 2017 in corresponding European Patent Application No. 14895709.5.
European Office Action dated Jan. 28, 2019 issued in European Patent Application No. 14 895 709.5 (6 pages).

* cited by examiner

METHOD FOR ESTABLISHING NETWORK CONNECTION, GATEWAY, AND TERMINAL

CROSS-REFERENCE TO RELATED APPLICATIONS

This application is a continuation of International Application No. PCT/CN2014/080751, filed on Jun. 25, 2014, the disclosure of which is hereby incorporated by reference in its entirety.

TECHNICAL FIELD

The present invention relates to the field of information technologies, and in particular, to a method for establishing a network connection, a gateway, and a terminal.

BACKGROUND

As information technologies gradually develop, a mobile network carries an increasingly large data volume, and as a result, the mobile network often runs under an overload condition. A WLAN (wireless local area network) is supported by many terminals, and both deployment costs and operation costs are relatively low. How to connect to a mobile network by means of a WLAN is a method for establishing a network connection to which people pay attention.

Currently, there are two manners of establishing a network connection. Manner 1: An IPsec (Internet Protocol Security) tunnel is established for a terminal that connects to a WLAN, and then, control plane IKEv2 (Internet Key Exchange) related to IPsec security is established to exchange mobile network connection information with the terminal, so as to establish a network connection. Manner 2: Subscription information of a terminal that connects to a WLAN is obtained, and a mobile network address is assigned to the terminal according to the subscription information of the terminal, so that the terminal accesses a mobile network according to the assigned mobile network address, so as to establish a network connection.

During implementation of the present invention, it is found that the prior art has at least the following problems:

For Manner 1, technologies for establishing an IPSec tunnel and exchanging IKEv2 data are relatively complex, and have a relatively high requirement on the terminal, thereby narrowing an application range of network establishment. For Manner 2, because the mobile network address is assigned to the terminal according to the subscription information of the terminal, this manner of establishing a network connection is not sufficiently flexible, and a range of networks to which the terminal connects is limited.

SUMMARY

To resolve the problems in the prior art, embodiments of the present invention provide a method for establishing a network connection, a gateway, and a terminal. The technical solutions are as follows:

According to a first aspect, a method for establishing a network connection is provided, where the method includes:

establishing a user plane connection to a terminal, where the terminal accesses a first WLAN;

receiving, by using the established user plane connection, a connection selection request sent by the terminal, where the connection selection request includes connection selection information;

determining, according to the connection selection information in the connection selection request, a service network selected by the terminal; and establishing a connection between the terminal and the service network selected by the terminal.

With reference to the first aspect, in a first possible implementation manner of the first aspect, before the establishing a user plane connection to a terminal, the method further includes:

performing authentication on the terminal that requests to access the first WLAN that corresponds to a first WLAN access point AP; and if authentication succeeds, performing authorization on the terminal, and sending a first terminal address to the terminal, so that the terminal accesses the first WLAN corresponding to the first WLAN AP, and transmitting, between the terminal and the first WLAN, a packet identified by using the first terminal address.

With reference to the first aspect, in a second possible implementation manner of the first aspect, after the receiving, by using the established user plane connection, a connection selection request sent by the terminal, the method further includes:

when the terminal disconnects from the first WLAN corresponding to a first WLAN AP, and re-chooses to access a second WLAN corresponding to a second WLAN AP, performing authentication on the terminal; and if authentication succeeds, performing authorization on the terminal, and sending a second terminal address to the terminal, so that the terminal accesses the second WLAN corresponding to the second WLAN AP, and transmitting, between the terminal and the second WLAN, a packet identified by using the second terminal address.

With reference to the first or the second possible implementation manner of the first aspect, in a third possible implementation manner of the first aspect, after the performing authorization on the terminal, the method further includes:

obtaining, from an initial service network, a terminal address that is assigned to the terminal to access the initial service network; or selecting a packet data network gateway PGW or a gateway general packet radio service support node GGSN for the terminal according to subscription information of the terminal, and establishing a bearer to the PGW or the GGSN; and obtaining, from the PGW or the GGSN, a terminal address that is assigned to the terminal to access an initial service network.

With reference to the third possible implementation manner of the first aspect, in a fourth possible implementation manner of the first aspect, after the sending a first terminal address to the terminal, the method further includes:

transmitting, by means of network address translation or network address and port translation and between the terminal and the initial service network, a packet identified by using the first terminal address and a packet identified by using the terminal address for accessing the initial service network.

With reference to the first possible implementation manner of the first aspect, in a fifth possible implementation manner of the first aspect, after the establishing a connection between the terminal and the service network selected by the terminal, the method further includes:

assigning, to the terminal, a terminal address for accessing the service network selected by the terminal; and transmitting, by means of network address translation or network address and port translation and between the terminal and the service network selected by the terminal, a packet identified by using the first terminal address and a packet identified by using the terminal address for accessing the service network selected by the terminal.

With reference to the first possible implementation manner of the first aspect, in a sixth possible implementation manner of the first aspect, after the determining, according to the connection selection information in the connection selection request, a service network selected by the terminal, the method further includes:

determining, according to subscription information of the terminal or a network configuration, whether to accept that the terminal is to be connected to the service network; and if it is accepted that the terminal is to be connected to the service network, performing the step of establishing a connection between the terminal and the service network selected by the terminal.

With reference to any one of the first aspect to the sixth possible implementation manner of the first aspect, in a seventh possible implementation manner of the first aspect, the receiving, by using the established user plane connection, a connection selection request sent by the terminal includes:

sending, to the terminal by using the established user plane connection, connection information that includes selectable connection selection information, and receiving, by using the established user plane connection, the connection selection request sent by the terminal according to the connection information; or receiving, by using the established user plane connection, the connection selection request sent by the terminal according to preconfigured connection selection information.

With reference to the seventh possible implementation manner of the first aspect, in an eighth possible implementation manner of the first aspect, after the receiving, by using the established user plane connection, a connection selection request sent by the terminal, the method further includes:

establishing, according to the connection selection request, a connection selection context corresponding to the terminal, where the connection selection context includes at least an identifier of the terminal, the service network selected by the terminal, and the connection information; and storing the connection selection context.

With reference to the eighth possible implementation manner of the first aspect, in a ninth possible implementation manner of the first aspect, the storing the connection selection context includes:

storing the connection selection context within preset validity duration.

With reference to the eighth possible implementation manner of the first aspect, in a tenth possible implementation manner of the first aspect, the establishing a connection between the terminal and the service network selected by the terminal includes:

determining whether the connection selection context corresponding to the terminal is stored; and if the connection selection context corresponding to the terminal is stored, determining, according to the connection selection context corresponding to the terminal, the service network selected by the terminal, and establishing the connection between the terminal and the service network selected by the terminal.

According to a second aspect, a method for establishing a network connection is provided, where the method includes:

accessing a first WLAN, and establishing a user plane connection to a gateway;

sending, by using the established user plane connection, a connection selection request to the gateway, where the connection selection request includes connection selection information; and establishing, by using the gateway, a connection to a service network corresponding to the connection selection information in the connection selection request.

With reference to the second aspect, in a first possible implementation manner of the second aspect, before the establishing a user plane connection to a gateway, the method further includes:

selecting a first WLAN AP, and establishing an association with the first WLAN AP; and requesting, from the gateway, to access the first WLAN corresponding to the first WLAN AP, and after the gateway successfully performs authentication and authorization, receiving a first terminal address sent by the gateway, accessing, by using the associated first WLAN AP, the first WLAN corresponding to the first WLAN AP, and transmitting, to the first WLAN, a packet identified by using the first terminal address.

With reference to the second aspect, in a second possible implementation manner of the second aspect, the sending, by using the established user plane connection, a connection selection request to the gateway includes:

receiving connection information that is sent by the gateway by using the established user plane connection and that includes selectable connection selection information;

displaying the received connection information on a user interface, and obtaining connection selection information selected by a user by using the user interface; and sending, to the gateway by using the established user plane connection, the connection selection request that includes the connection selection information selected by the user.

With reference to the second aspect, in a third possible implementation manner of the second aspect, the sending, by using the established user plane connection, a connection selection request to the gateway includes:

obtaining preconfigured connection selection information by using a user interface, and sending, to the gateway by using the established user plane connection, the connection selection request that includes the preconfigured connection selection information.

With reference to the second aspect, in a fourth possible implementation manner of the second aspect, after the sending, by using the established user plane connection, a connection selection request to the gateway, the method further includes:

selecting a second WLAN AP, and establishing an association with the second WLAN AP; and requesting, from the gateway, to access a second WLAN corresponding to the second WLAN AP, and after the gateway successfully performs authentication and authorization, receiving a second terminal address sent by the gateway, accessing, by using the associated second WLAN AP, the second WLAN corresponding to the second WLAN AP, and transmitting, to the second WLAN, a packet identified by using the second terminal address.

According to a third aspect, a gateway is provided, where the gateway includes:

a first connection module, configured to establish a user plane connection to a terminal, where the terminal accesses a first WLAN;

a receiving module, configured to receive, by using the established user plane connection, a connection selection request sent by the terminal, where the connection selection request includes connection selection information;

a first determining module, configured to determine, according to the connection selection information in the connection selection request, a service network selected by the terminal; and a second connection module, configured to establish a connection between the terminal and the service network selected by the terminal.

With reference to the third aspect, in a first possible implementation manner of the third aspect, the gateway further includes:

a first authentication module, configured to perform authentication on the terminal that requests to access the first WLAN that corresponds to a first WLAN AP;

a first authorization module, configured to: when the authentication succeeds, perform authorization on the terminal;

a first sending module, configured to send a first terminal address to the terminal, so that the terminal accesses the first WLAN corresponding to the first WLAN AP; and a first transmission module, configured to transmit, between the terminal and the first WLAN, a packet identified by using the first terminal address.

With reference to the third aspect, in a second possible implementation manner of the third aspect, the gateway further includes:

a second authentication module, configured to: when the terminal disconnects from the first WLAN corresponding to a first WLAN AP, and re-chooses to access a second WLAN corresponding to a second WLAN AP, perform authentication on the terminal;

a second authorization module, configured to: when the authentication succeeds, perform authorization on the terminal;

a second sending module, configured to send a second terminal address to the terminal, so that the terminal accesses the second WLAN corresponding to the second WLAN AP; and a second transmission module, configured to transmit, between the terminal and the second WLAN, a packet identified by using the second terminal address.

With reference to the first or the second possible implementation manner of the third aspect, in a third possible implementation manner of the third aspect, the gateway further includes:

a first obtaining module, configured to obtain, from an initial service network, a terminal address that is assigned to the terminal to access the initial service network; or a selection module, configured to select a PGW or a GGSN for the terminal according to subscription information of the terminal; a first establishment module, configured to establish a bearer to the PGW or the GGSN; and a second obtaining module, configured to obtain, from the PGW or the GGSN, a terminal address that is assigned to the terminal to access an initial service network.

With reference to the third possible implementation manner of the third aspect, in a fourth possible implementation manner of the third aspect, the gateway further includes:

a third transmission module, configured to transmit, by means of network address translation or network address and port translation and between the terminal and the initial service network, a packet identified by using the first terminal address and a packet identified by using the terminal address for accessing the initial service network.

With reference to the first possible implementation manner of the third aspect, in a fifth possible implementation manner of the third aspect, the gateway further includes:

an assignment module, configured to assign, to the terminal, a terminal address for accessing the service network selected by the terminal; and a fourth transmission module, configured to transmit, by means of network address translation or network address and port translation and between the terminal and the service network selected by the terminal, a packet identified by using the first terminal address and a packet identified by using the terminal address for accessing the service network selected by the terminal.

With reference to the first possible implementation manner of the third aspect, in a sixth possible implementation manner of the third aspect, the gateway further includes:

a second determining module, configured to determine, according to subscription information of the terminal or a network configuration, whether to accept that the terminal is to be connected to the service network; and a second connection module, configured to: when it is accepted that the terminal is to be connected to the service network, perform the step of establishing a connection between the terminal and the service network selected by the terminal.

With reference to any one of the third aspect to the sixth possible implementation manner of the third aspect, in a seventh possible implementation manner of the third aspect, the receiving module is configured to send, to the terminal by using the established user plane connection, connection information that includes selectable connection selection information, and receive, by using the established user plane connection, the connection selection request sent by the terminal according to the connection information; or the receiving module is configured to receive, by using the established user plane connection, the connection selection request sent by the terminal according to preconfigured connection selection information.

With reference to the seventh possible implementation manner of the third aspect, in an eighth possible implementation manner of the third aspect, the gateway further includes:

a second establishment module, configured to establish, according to the connection selection request, a connection selection context corresponding to the terminal, where the connection selection context includes at least an identifier of the terminal, the service network selected by the terminal, and the connection information; and a storage module, configured to store the connection selection context.

With reference to the eighth possible implementation manner of the third aspect, in a ninth possible implementation manner of the third aspect, the storage module is configured to store the connection selection context within preset validity duration.

With reference to the eighth possible implementation manner of the third aspect, in a tenth possible implementation manner of the third aspect, the second connection module includes:

a judging unit, configured to determine whether the connection selection context corresponding to the terminal is stored;

a determining unit, configured to: when the connection selection context corresponding to the terminal is stored, determine, according to the connection selection context corresponding to the terminal, the service network selected by the terminal; and a connection unit, configured to establish the connection between the terminal and the service network selected by the terminal.

According to a fourth aspect, a terminal is provided, where the terminal includes:

a first access module, configured to access a first WLAN;

a first connection module, configured to establish a user plane connection to a gateway;

a sending module, configured to send, by using the established user plane connection, a connection selection request to the gateway, where the connection selection request includes connection selection information; and a second connection module, configured to establish, by using the gateway, a connection to a service network corresponding to the connection selection information in the connection selection request.

With reference to the fourth aspect, in a first possible implementation manner of the fourth aspect, the terminal further includes:

a first selection module, configured to select a first WLAN AP;

a first association module, configured to establish an association with the first WLAN AP;

a first request module, configured to request, from the gateway, to access the first WLAN corresponding to the first WLAN AP;

a first receiving module, configured to: after the gateway successfully performs authentication and authorization, receive a first terminal address sent by the gateway, where the first access module is configured to access, by using the associated first WLAN AP, the first WLAN corresponding to the first WLAN AP; and a first transmission module, configured to transmit, to the first WLAN, a packet identified by using the first terminal address.

With reference to the fourth aspect, in a second possible implementation manner of the fourth aspect, the sending module includes:

a receiving unit, configured to receive connection information that is sent by the gateway by using the established user plane connection and that includes selectable connection selection information;

a display unit, configured to display the received connection information on a user interface;

a first obtaining unit, configured to obtain connection selection information selected by a user by using the user interface; and a first sending unit, configured to send, to the gateway by using the established user plane connection, the connection selection request that includes the connection selection information selected by the user.

With reference to the fourth aspect, in a third possible implementation manner of the fourth aspect, the sending module includes:

a second obtaining unit, configured to obtain preconfigured connection selection information by using a user interface; and a second sending unit, configured to send, to the gateway by using the established user plane connection, the connection selection request that includes the preconfigured connection selection information.

With reference to the fourth aspect, in a fourth possible implementation manner of the fourth aspect, the terminal further includes:

a second selection module, configured to select a second WLAN AP;

a second association module, configured to establish an association with the second WLAN AP;

a second request module, configured to request, from the gateway, to access a second WLAN corresponding to the second WLAN AP;

a second receiving module, configured to: after the gateway successfully performs authentication and authorization, receive a second terminal address sent by the gateway;

a second access module, configured to access, by using the associated second WLAN AP, the second WLAN corresponding to the second WLAN AP; and a second transmission module, configured to transmit, to the second WLAN, a packet identified by using the second terminal address.

The technical solutions provided in the embodiments of the present invention bring about the following beneficial effects:

A connection selection request that includes connection selection information and that is sent by a terminal is received by using an established user plane connection to the terminal, and after a service network selected by the terminal is determined according to the connection selection information, a connection between the terminal and the service network selected by the terminal is established. In this way, the terminal can connect to different service networks, so that a network connection manner becomes more flexible, interaction between the terminal and a gateway is simplified, and a network connection range is expanded.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
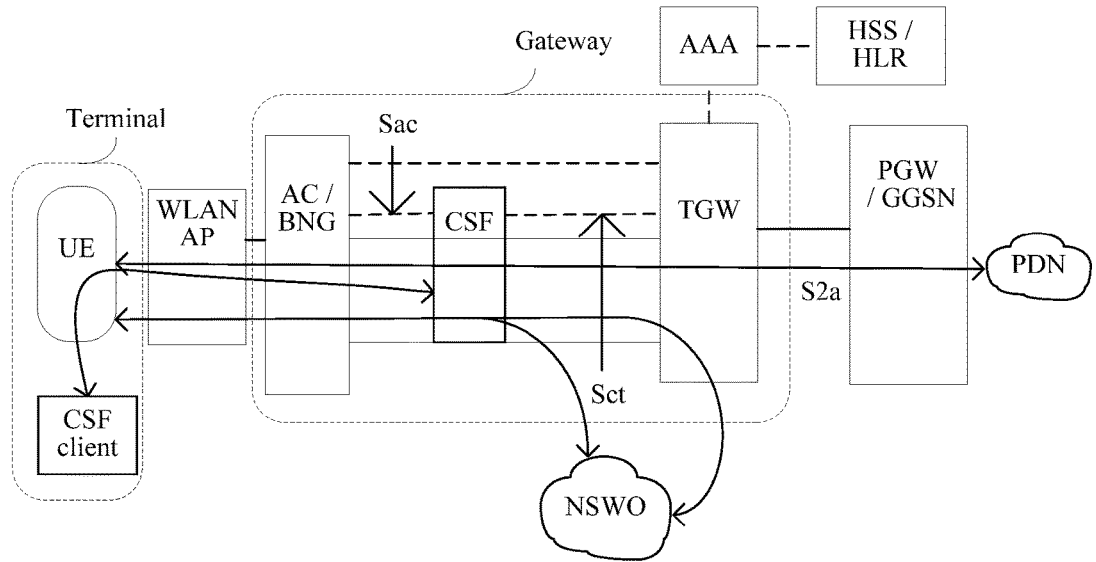
FIG. 1 is a schematic structural diagram of a system according to an embodiment of the present invention.
Figure 2:
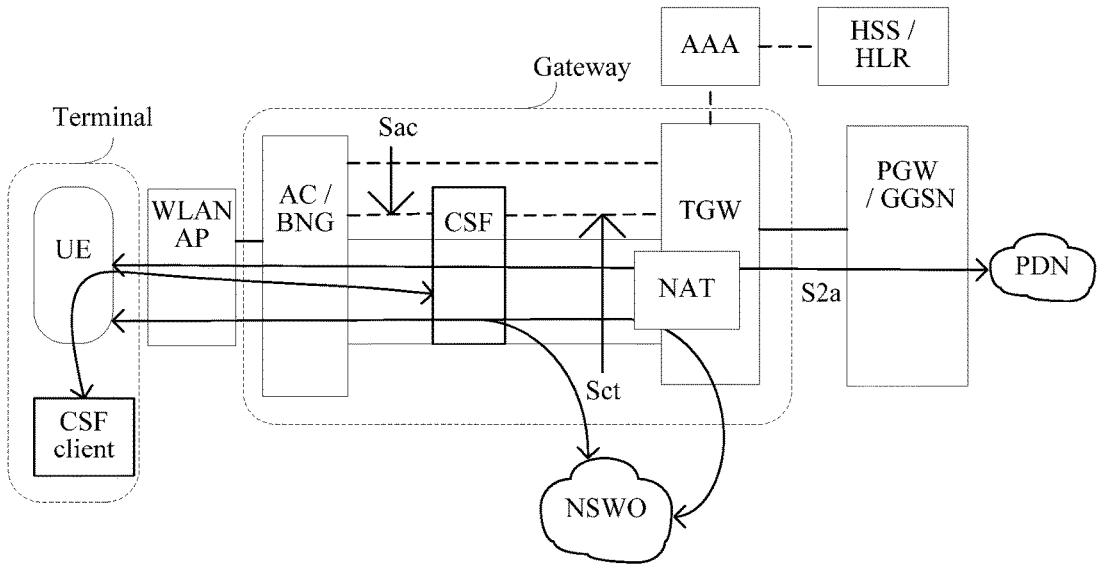
FIG. 2 is a schematic structural diagram of a system according to another embodiment of the present invention.

For a manner of connecting to a service network by using a WLAN, an embodiment of the present invention provides a method for establishing a network connection, and this method is applied to a system shown in FIG. 1 or FIG. 2.

The system shown in FIG. 1 includes a terminal, a gateway, and other network-side devices. The terminal includes UE (user equipment) and a CSF (connection selection function) Client (client). The gateway includes an AC (access controller)/BNG (broadband network gateway), a CSF, and a TGW (trusted gateway). The other network-side devices include an AAA (authentication, authorization, and accounting) server, an HSS (home subscriber server)/HLR (home location register), and a PGW (the packet data network gateway)/GGSN (gateway general packet radio service support node). After connecting to the gateway by using a WLAN AP (access point), the terminal may connect to a PDN (packet data network) or an NSWO (non seamless wireless local area network offload) by using the gateway.

When a WLAN accessed by the UE is a TWAN (trusted wireless local area network access network), a function of performing authentication and authorization by the AC/BNG and the TGW on the UE corresponds to a TWAP (trusted wireless local area network authentication authorization accounting proxy) in the TWAN, and a function of performing user-plane management by the AC/BNG and the TGW on the UE corresponds to a TWAG (trusted wireless local area network access gateway) in the TWAN.

The CSF may be located between the AC/BNG and the TGW, an interface Sct exists between the CSF and the TGW, and the CSF may be further combined with the AC/BNG or the TGW. The AC/BNG may be combined with the TGW to serve as a TWAG and in this case, the CSF is integrated into the TWAG/TWAP.

When the UE is connected to the NSWO, if a user-plane packet of the UE is routed by the AC/BNG; an interface Sac exists between the CSF and the AC/BNG When the UE is connected to the NSWO, if a user-plane packet of the UE is routed by the TGW, there may be no interface between the CSF and the AC/BNG The system shown in FIG. 2 includes a terminal, a gateway, and other network-side devices. The terminal includes UE and a CSF Client. The gateway includes an AC/BNG a CSF, an NAT (network address translation) gateway, and a TGW. The other network-side devices include an AAA, an HSS/HLR, and a PGW/GGSN. The NAT may be located in the TGW, or may be located in the AC/BNG or may be located between the TGW and the AC/BNG (in this embodiment, an example in which the NAT in FIG. 2 is located in the TGW is used). After connecting to the gateway by using a WLAN AP, the terminal may connect to a PDN or an NSWO by using the gateway.

Figure 3:
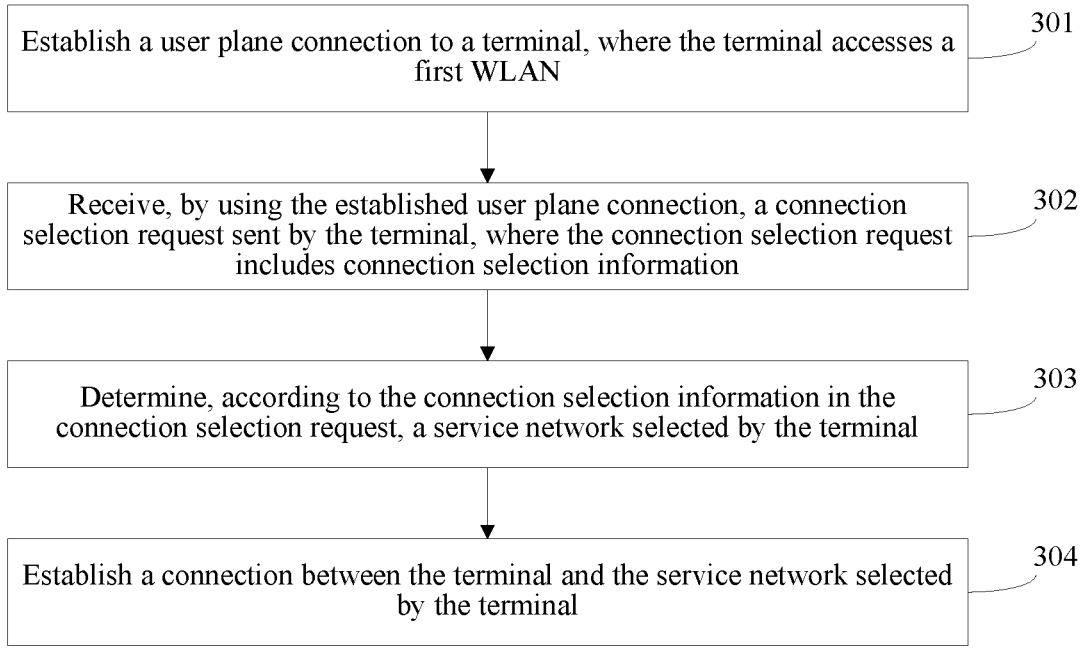
FIG. 3 is a flowchart of a method for establishing a network connection according to another embodiment of the present invention.

With reference to the foregoing system, an example in which the gateway performs a method provided in an embodiment of the present invention is used. Referring to FIG. 3, a process of the method provided in this embodiment includes:

301: Establish a user plane connection to a terminal, where the terminal accesses a first WLAN.

In an optional embodiment, before the establishing a user plane connection to a terminal, the method further includes:

performing authentication on the terminal that requests to access the first WLAN that corresponds to a first WLAN AP; and if authentication succeeds, performing authorization on the terminal, and sending a first terminal address to the terminal, so that the terminal accesses the first WLAN corresponding to the first WLAN AP, and transmitting, between the terminal and the first WLAN, a packet identified by using the first terminal address.

In an optional embodiment, after the sending a first terminal address to the terminal, the method further includes:

transmitting, by means of network address translation or network address and port translation and between the terminal and an initial service network, a packet identified by using the first terminal address and a packet identified by using a terminal address for accessing the initial service network.

302: Receive, by using the established user plane connection, a connection selection request sent by the terminal, where the connection selection request includes connection selection information.

In an optional embodiment, after the receiving, by using the established user plane connection, a connection selection request sent by the terminal, the method further includes:

when the terminal disconnects from the first WLAN corresponding to the first WLAN AP, and re-chooses to access a second WLAN corresponding to a second WLAN AP, performing authentication on the terminal; and if authentication succeeds, performing authorization on the terminal, and sending a second terminal address to the terminal, so that the terminal accesses the second WLAN corresponding to the second WLAN AP, and transmitting, between the terminal and the second WLAN, a packet identified by using the second terminal address.

In an optional embodiment, after the performing authorization on the terminal, the method further includes:

obtaining, from an initial service network, a terminal address that is assigned to the terminal to access the initial service network; or selecting a PGW or a GGSN for the terminal according to subscription information of the terminal, and establishing a bearer to the PGW or the GGSN; and obtaining, from the PGW or the GGSN, a terminal address that is assigned to the terminal to access an initial service network.

In an optional embodiment, the receiving, by using the established user plane connection, a connection selection request sent by the terminal includes:

sending, to the terminal by using the established user plane connection, connection information that includes selectable connection selection information, and receiving, by using the established user plane connection, the connection selection request sent by the terminal according to the connection information; or receiving, by using the established user plane connection, the connection selection request sent by the terminal according to preconfigured connection selection information.

In an optional embodiment, after the receiving, by using the established user plane connection, a connection selection request sent by the terminal, the method further includes:

establishing, according to the connection selection request, a connection selection context corresponding to the terminal, where the connection selection context includes at least an identifier of the terminal, the service network selected by the terminal, and the connection information; and storing the connection selection context.

In an optional embodiment, the storing the connection selection context includes:

storing the connection selection context within preset validity duration.

303: Determine, according to the connection selection information in the connection selection request, a service network selected by the terminal.

In an optional embodiment, after the determining, according to the connection selection information in the connection selection request, a service network selected by the terminal, the method further includes:

determining, according to subscription information or a network configuration, whether to accept that the terminal is to be connected to the service network; and if it is accepted that the terminal is to be connected to the service network, performing the step of establishing a connection between the terminal and the service network selected by the terminal.

304: Establish a connection between the terminal and the service network selected by the terminal.

In an optional embodiment, after the establishing a connection between the terminal and the service network selected by the terminal, the method further includes:

assigning, to the terminal, a terminal address for accessing the service network selected by the terminal; and transmitting, by means of network address translation or network address and port translation and between the terminal and the service network selected by the terminal, a packet identified by using the first terminal address and a packet identified by using the terminal address for accessing the service network selected by the terminal.

In an optional embodiment, the establishing a connection between the terminal and the service network selected by the terminal includes:

determining whether the connection selection context corresponding to the terminal is stored; and if the connection selection context corresponding to the terminal is stored, determining, according to the connection selection context corresponding to the terminal, the service network selected by the terminal, and establishing the connection between the terminal and the service network selected by the terminal.

Figure 4:
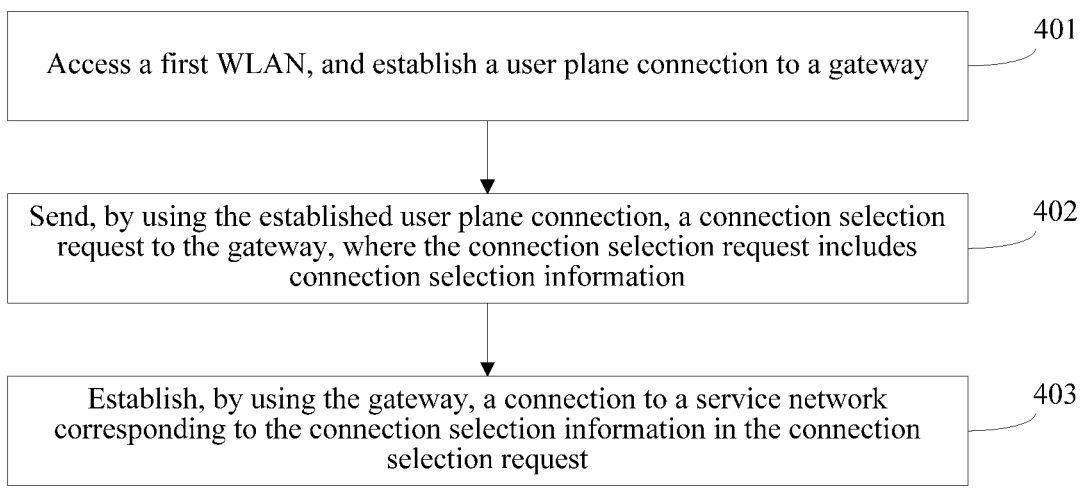
FIG. 4 is a flowchart of a method for establishing a network connection according to another embodiment of the present invention.

Referring to FIG. 4, an example in which a terminal performs a method for establishing a network connection provided in an embodiment of the present invention is used, and a process of the method provided in this embodiment of the present invention includes:

401: Access a first WLAN, and establish a user plane connection to a gateway.

In an optional embodiment, before the establishing a user plane connection to a gateway, the method further includes:

selecting a first WLAN AP, and establishing an association with the first WLAN AP; and requesting, from the gateway, to access the first WLAN corresponding to the first WLAN AP, and after the gateway successfully performs authentication and authorization, receiving a first terminal address sent by the gateway, accessing, by using the associated first WLAN AP, the first WLAN corresponding to the first WLAN AP, and transmitting, to the first WLAN, a packet identified by using the first terminal address.

402: Send, by using the established user plane connection, a connection selection request to the gateway, where the connection selection request includes connection selection information.

In an optional embodiment, the sending, by using the established user plane connection, a connection selection request to the gateway includes:

receiving connection information that is sent by the gateway by using the established user plane connection and that includes selectable connection selection information;

displaying the received connection information on a user interface, and obtaining connection selection information selected by a user by using the user interface; and sending, to the gateway by using the established user plane connection, the connection selection request that includes the connection selection information selected by the user.

In an optional embodiment, the sending, by using the established user plane connection, a connection selection request to the gateway includes:

obtaining preconfigured connection selection information by using a user interface, and sending, to the gateway by using the established user plane connection, the connection selection request that includes the preconfigured connection selection information.

In an optional embodiment, after the sending, by using the established user plane connection, a connection selection request to the gateway, the method further includes:

selecting a second WLAN AP, and establishing an association with the second WLAN AP; and requesting, from the gateway, to access a second WLAN corresponding to the second WLAN AP, and after the gateway successfully performs authentication and authorization, receiving a second terminal address sent by the gateway, accessing, by using the associated second WLAN AP, the second WLAN corresponding to the second WLAN AP, and transmitting, to the second WLAN, a packet identified by using the second terminal address.

403: Establish, by using the gateway, a connection to a service network corresponding to the connection selection information in the connection selection request.

According to the method provided in this embodiment of the present invention, a connection selection request that includes connection selection information and that is sent by a terminal is received by using an established user plane connection to the terminal, and after a service network selected by the terminal is determined according to the connection selection information, a connection between the terminal and the service network selected by the terminal is established. In this way, the terminal can connect to different service networks, so that a network connection manner becomes more flexible, interaction between the terminal and a gateway is simplified, and a network connection range is expanded.

Figure 5:
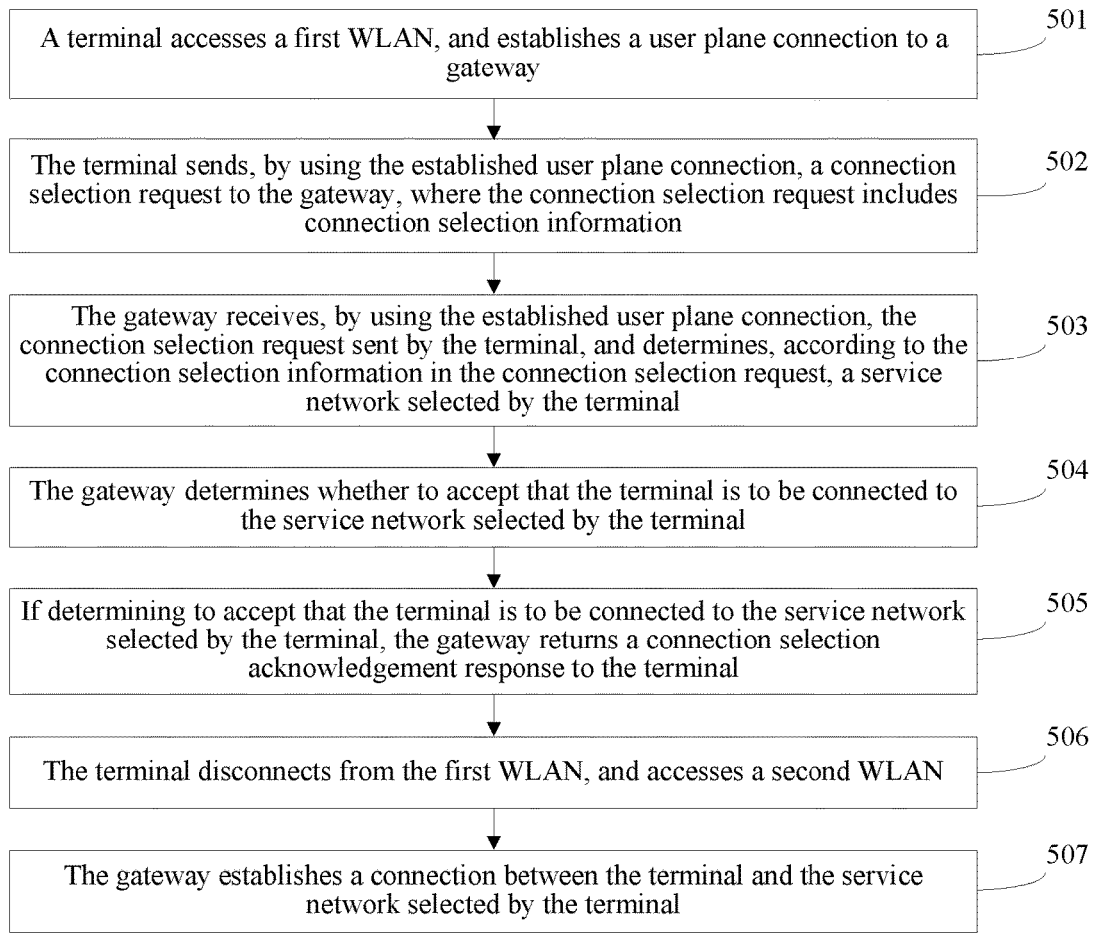
FIG. 5 is a flowchart of a method for establishing a network connection according to another embodiment of the present invention.

An embodiment of the present invention provides a method for establishing a network connection, and the method provided in this embodiment of the present invention is described in detail by using the system shown in FIG. 1 as an example. Referring to FIG. 5, a process of the method includes:

501: A terminal accesses a first WLAN, and establishes a user plane connection to a gateway.

In an optional embodiment, the accessing a first WLAN by a terminal includes but is not limited to:

selecting a first WLAN AP, and establishing an association with the first WLAN AP; and requesting, from the gateway, to access the WLAN corresponding to the first WLAN AP, and after the gateway successfully performs authentication and authorization, accessing, by using the associated first WLAN AP, the WLAN corresponding to the first WLAN AP.

Before the user plane connection to the gateway is established, a process in which the gateway performs authentication and authorization on the terminal that accesses the first WLAN includes but is not limited to:

performing authentication on the terminal that requests to access the first WLAN that corresponds to a first WLAN AP; and if authentication succeeds, performing authorization on the terminal, so that the terminal accesses the first WLAN corresponding to the first WLAN AP.

During specific implementation, referring to the system shown in FIG. 1, the AC/BNG and the TGW perform authentication and authorization on the terminal that requests to access the first WLAN corresponding to the first WLAN AP. An authentication process includes but is not limited to: The HSS/HLR sends subscription information of the UE to the TWAN by using the AAA server, that is, sending subscription information of the UE to the TGW and the AC/BNG that are configured to perform authentication and authorization on the UE, and the AAA server sends an ID (identifier) of the UE to the TGW corresponding to the TWAN, where the ID of the UE may be an IMSI (international mobile subscriber identity). The AC/BNG determines, according to the subscription information of the terminal, whether to accept the request of the terminal to access the WLAN corresponding to the first WLAN AP. If the AC/BNG determines to accept the request of the terminal to access the WLAN corresponding to the first WLAN AP, the authentication succeeds. When the authentication succeeds, authorization is performed on the terminal, so that the terminal accesses the first WLAN corresponding to the first WLAN AP.

It should be noted that, the method provided in this embodiment is described by using a manner of EAP (Extensible Authentication Protocol) authentication performed between the terminal and the gateway as an example. Certainly, in addition to the EAP (EAP-SIM (subscriber identity module), EAP-AKA (authentication and key agreement), EAP-AKA', EAP-PEAP (Protected Extensible Authentication Protocol), or the like) authentication manner, other authentication manners such as PSK (pre-shared key) and Portal may also be used, which is not specifically limited in this embodiment.

Moreover, when the gateway performs authentication and authorization on the terminal, the method further includes a step of sending a first terminal address to the terminal, so that a packet identified by using the first terminal address may be subsequently transmitted between the terminal and the first WLAN. For a terminal side, a process of receiving the first terminal address sent by the gateway is further included, so that a packet identified by using the first terminal address is subsequently transmitted to the first WLAN. The first terminal address sent by the gateway to the terminal may be a terminal address assigned by the gateway, or may be a terminal address obtained by the gateway by means of the DHCP (Dynamic Host Configuration Protocol); and a manner of obtaining the first terminal address by the gateway is not limited in this embodiment. For a packet identified by using the first terminal address, in an uplink direction between the terminal and the first WLAN, the first terminal address may be used as a source address of an IP header of a packet, and in a downlink direction between the terminal and the first WLAN, the first terminal address may be used as a destination address of an IP header of a packet.

In an optional embodiment, after the gateway performs authorization on the terminal, the method further includes but is not limited to one optional step of the following two optional steps:

Optional step 1: Obtain, from an initial service network, a terminal address that is assigned to the terminal to access the initial service network.

Optional step 2: Select a PGW or a GGSN for the terminal according to subscription information of the terminal, and establish a bearer to the PGW or the GGSN; and obtain, from the PGW or the GGSN, a terminal address that is assigned to the terminal to access an initial service network.

The initial service network is not limited in this embodiment; and the initial service network may be a default service network, or may be an initial service network selected by the gateway for the terminal. For the foregoing optional step 1, a manner of obtaining, from the initial service network, the terminal address that is assigned to the terminal to access the initial service network is not limited in this embodiment. For the foregoing optional step 2, referring to the system shown in FIG. 1, after the gateway performs authorization on the terminal, the TGW selects a PGW/GGSN for the terminal according to a default APN (access point name) in the subscription information of the terminal. When the TGW is connected to the PGW, an S2a tunnel between the TGW and the PGW is based on a GTP (General Packet Radio Service Tunneling Protocol) tunnel, and the TGW sends a Create Session Request to the PGW. The Create Session Request includes an IMSI, an APN, a PCO (protocol configuration option), an RAT (Radio Access Technology) type, a TWAN TEID (tunnel endpoint identifier) of a control plane, a PDN Type, a PDN Address, an EPS (evolved packet system) Bearer Identity, Default EPS Bearer QoS (default evolved packet system bearer quality of service), a TWAN Address for the user plane (trusted wireless local area network access network address for the user plane), a TWAN TEID of the user plane (trusted wireless local area network access network tunnel endpoint identifier of the user plane), an APN-AMBR (aggregate maximum bit rate), a Selection Mode, a Dual Address Bearer Flag, Trace Information, Charging Characteristics, and Additional parameters, where the RAT type indicates WLAN access.

The PGW returns a Create Session Response to the TGW. The Create Session Response includes a PDN GW Address for the user plane (packet data network gateway address for the user plane), a PDN GW TEID of the user plane (packet data network gateway tunnel endpoint identifier of the user plane), a PDN GW TEID of the control plane (packet data network gateway tunnel endpoint identifier of the control plane), a PCO, a PDN Type, a PDN Address, an EPS Bearer Identity, EPS Bearer QoS, an APN-AMBR, Additional parameters, and a Cause, where the PDN address is an IP address assigned to the terminal. The PGW may initiate establishment of multiple other dedicated bearers of the PDN connection according to a PCC (policy control and charging) policy.

When the TGW is connected to the PGW, the S2a tunnel between the TGW and the PGW may also be based on a PMIP (Proxy Mobile Internet Protocol) tunnel, and in this case, an MAG (mobile access gateway) in the TGW sends a Proxy Binding Update to the PGW, where the proxy binding update carries parameters such as the APN, the PCO, the PDN Type, and the RAT Type that are carried in the Create Session Request. The PGW returns a Proxy Binding Acknowledgement to the TGW, where the proxy binding acknowledgement carries parameters such as a PDP (Packet Data Protocol) Type, a PDP Address, and the Protocol Configuration Options that are carried in the Create Session Response.

When the TGW is connected to the GGSN, the TGW sends a Create PDP Context Request to the GGSN. The Create PDP Context Request includes a PDP Type, a PDP Address, an Access Point Name, QoS Negotiated (quality of service negotiated), a Negotiated Evolved ARP (Address Resolution Protocol), a TEID, an NSAPI (network service access point identifier), an MSISDN (mobile station international integrated service digital network number), a Selection Mode, Charging Characteristics, a Trace Reference, a Trace Type, a Trigger Id, an OMC (operations and maintenance center) Identity, Protocol Configuration Options, a serving network identity (serving network identity), a Maximum APN Restriction (maximum access point name restriction) IMEISV (international mobile equipment identity software version), a CGI (cell global identifier)/SAI (server availability index), an RAT type, S-CDR (serving general packet radio service support node-charging data recording) CAMEL (Customized Applications for Mobile Network Enhanced Logic) information, an MS Info Change Reporting support indication, an NRSN, a Dual Address Bearer Flag, an APN-AMBR, and a max MBR/APN-AMBR.

The GGSN returns a Create PDP Context Response to the TGW. The Create PDP Context Response includes a TEID, a PDP Type, a PDP Address, Protocol Configuration Options, QoS Negotiated, a Negotiated Evolved ARP, a Charging Id (charging identifier), Prohibit Payload Compression, APN Restriction, a Cause, an MS Info Change Reporting Action (mobile subscriber information change reporting action), a CSG (closed subscriber group) Information Reporting Action, BCM (basic call management), and an APN-AMBR.

It should be noted that, regardless of which optional step described above is used, after assigning, to the terminal, the terminal address for accessing the initial service network, the gateway may receive a DHCP request sent to the gateway by the UE that has been authenticated, and the gateway adds, to a DHCP response according to the DHCP request, the terminal address assigned to the terminal to access the initial service network and returns the DHCP response to the terminal, so that the terminal accesses the initial service network according to the terminal address for accessing the initial service network. A process in which the UE sends the DHCP request to the gateway may be performed after the gateway performs access authentication on the UE, selects a PGW or a GGSN for the UE, and establishes a bearer to the PGW or the GGSN. Optionally, alternatively, after the gateway performs authentication on the UE, the UE may send the DHCP request to the gateway, to trigger the step of selecting, by the gateway, a PGW or a GGSN for the UE, establishing a bearer to the PGW or the GGSN, and obtaining, from the PGW or the GGSN, the terminal address assigned to the UE to access the initial service network. Regardless of which sequence is used, after a connection of the terminal to the initial service network is established, the UE may access the initial service network by using the terminal address assigned to the UE to access the initial service network, that is, send an uplink packet to the initial service network or receive a downlink packet sent by the initial service network.

Further, after the connection of the terminal to the initial service network is established, because the initial service network is a default service network, the terminal cannot learn of a type of the initial service network, and consequently, service usage of the terminal is obstructed. Therefore, to make a network connection manner more flexible, in the method provided in this embodiment, the user plane connection is established between the terminal and the gateway, so that the terminal may select different connections according to the user plane connection by using subsequent steps, to access different service networks. The user connection may be established in multiple manners, which is not specifically limited in this embodiment. For example, the terminal establishes the user plane connection to the gateway by using a connected service network, and a process of establishing, by the gateway, the user plane connection to the terminal by using a connected service network is:

(1) The terminal sends an uplink IP packet to the gateway, where a particular address (for example, 192.168.254.254) is used as a destination address, and a particular UDP port (for example, 8008) may also be set.

(2) The gateway executes an SPI (serial peripheral interface) to check an uplink packet; after intercepting the IP packet having the particular address, queries from the TGW according to a source address of the IP packet and performs comparison with a link of the terminal, to verify legality of the IP packet (a CSF connection establishment request). If the IP packet is sent by the terminal on which access authentication has been performed, the IP packet is legal, and a subsequent step may continue to be performed; or if the IP packet is sent by a terminal on which access authentication has not been performed, the IP packet is illegal, and a process of establishing the user plane connection is terminated.

(3) After verifying the legality of the IP packet, the gateway sends a reply IP packet to the terminal, and after the terminal receives the reply IP packet, the connection between the terminal and the gateway is successfully established, that is, the user plane connection between the terminal and the gateway is successfully established.

It should be noted that in a connection establishment process, the terminal may interact with the gateway for multiple times. Optionally, to facilitate verification performed by the gateway on the terminal, in a process of interacting with the gateway, the terminal may further add an ID of the terminal to the sent uplink IP packet, where the ID of the terminal includes but is not limited to an IMSI of the terminal and the like. Moreover, for the system shown in FIG. 1, functions performed by the gateway may be performed by the CSF.

502: The terminal sends, by using the established user plane connection, a connection selection request to the gateway, where the connection selection request includes connection selection information.

A manner of obtaining the connection selection information included in the connection selection request sent by the terminal to the gateway by using the established user plane connection is not specifically limited in this embodiment. In an optional embodiment, to enable the terminal to send the connection selection request to the gateway by using the established user plane connection, the gateway sends connection information to the terminal by using the established user plane connection, where the connection information includes selectable connection selection information, and the terminal receives the connection information sent by the gateway by using the established user plane connection. Optionally, alternatively, the terminal may display the received connection information on a user interface, and obtain connection selection information selected by a user by using the user interface. Finally, the terminal sends, to the gateway by using the established user plane connection, the connection selection request that includes the connection selection information selected by the user, so that the terminal sends the connection selection request to the gateway by using the established user plane connection.

When the gateway sends the connection information to the terminal by using the established user plane connection, the CSF may send the connection information to the terminal, where the connection information may be obtained by the CSF from the TGW. The connection information may include but is not limited to one or more pieces of information of a current connection type (for example, a PDN connection type or an NSWO connection type), a name of a currently connected service network (for example, a network name is an APN or a PDN ID/PDN name), a connection type to which the terminal subscribes, a name of a service network to which the terminal subscribes, a connection type that is supported by current WLAN access and that is of a connection that may be performed by the terminal, a name of a service network that is supported by current WLAN access and to which the terminal may connect, a default connection type, or a name of a service network connected by default. Optionally, to enable a user on the terminal side to intuitively identify information in the connection information, each type of information may further carry an icon or a text corresponding to the information.

Figure 6:
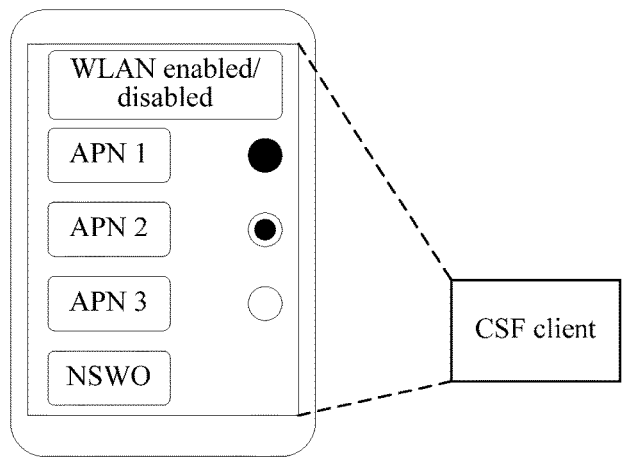
FIG. 6 is a schematic diagram of a user interface according to another embodiment of the present invention.

Referring to a user interface shown in FIG. 6, if the received connection information is displayed, a CSF client of the terminal may display the received connection information on the user interface, and obtain the connection selection information selected by the user. The connection information displayed on the user interface may include but is not limited to a connection type and a service network name; and a current connection, a selectable connection, an unselectable connection may be displayed differently (for example, a current connection, a selectable connection, and an unselectable connection are displayed in different colors, and an unselectable connection may be displayed as unselectable on the user interface). A user default connection option may also be provided for each connection, and the user may set any connection to a user default connection; and therefore, after the terminal is connected to a network, the CSF client automatically selects the user default connection for the terminal, so as to improve network connection efficiency. Moreover, a modification option may also be provided to obtain APN information manually modified or added by the user by using the modification option. For example, an APN is added, or an APN, a PCO, a PDN Type/PDP Type, and the like of existing connection information of the CSF client are modified.

The CSF client uses one or more of a PDN connection, an NSWO, or APN information (an APN, a PCO, a PDN Type/PDP Type, and the like) of the connection as the connection selection information, adds the connection selection information to the connection selection request, and sends the connection selection request to the CSF, so that the connection selection request is sent to the gateway.

In an optional embodiment, in addition to that the gateway sends the connection information that includes the selectable connection selection information to the terminal, and the terminal obtains, according to the connection information, the connection selection information selected by the user, the terminal may also obtain preconfigured connection selection information by using the user interface, and send, to the gateway by using the established user plane connection, the connection selection request that includes the preconfigured connection selection information.

503: The gateway receives, by using the established user plane connection, the connection selection request sent by the terminal, and determines, according to the connection selection information in the connection selection request, a service network selected by the terminal.

In an optional embodiment, if the terminal sends, to the gateway by using the established user plane connection, the connection selection request that includes connection information selected by the user, the gateway receives, by using the established user plane connection, the connection selection request sent by the terminal according to the connection information. During specific implementation, referring to the system shown in FIG. 1, the CSF may receive the connection selection request.

Moreover, the terminal uses one or more of a PDN connection, an NSWO, or APN information (an APN, a PCO, a PDN Type/PDP Type, and the like) of the connection as the connection selection information, and adds the connection selection information to the connection selection request; therefore, after receiving the connection selection request sent by the terminal, the gateway may determine, according to the connection selection information in the connection selection request, the service network selected by the terminal.

In an optional embodiment, after the receiving, by using the established user plane connection, the connection selection request sent by the terminal, the method further includes but is not limited to:

establishing, according to the connection selection request, a connection selection context corresponding to the terminal, where the connection selection context includes at least an identifier of the terminal, the service network selected by the terminal, and the connection information; and storing the connection selection context.

When the connection selection context is stored, the connection selection context may be stored within preset validity duration, and after the preset validity duration, the connection selection context is no longer stored. A length of the preset validity duration is not specifically limited in this embodiment.

When the terminal selects an NSWO, and a packet of the NSWO is routed by an AC/BNG through a CSF, but not through a TGW, the CSF notifies the AC/BNG that the terminal selects the NSWO, and carry an ID of the terminal. The TGW or the AC/BNG establishes the connection selection context for the terminal, records the ID of the terminal, a selected connection (to connect to the PDN or the NSWO), and connection information (for example, an APN, a PCO, a PDN Type/PDP Type, and the like), starts a connection selection timer, and performs network connection within a time defined by a value of the connection selection timer.

The value of the connection selection timer may be locally configured by the TGW or the AC/BNG according to an operator policy, or may be sent by the CSF to the TGW or the AC/BNG When the value is sent by the CSF to the TGW, the value may be sent by the CSF client of the terminal to the CSF when the CSF client of the terminal sends the connection selection request.

504. The gateway determines whether to accept that the terminal is to be connected to the service network selected by the terminal.

This step is an optional step, and a manner of determining, by the gateway, whether to accept that the terminal is to be connected to the service network selected by the terminal, is not specifically limited in this embodiment. During specific implementation, the manner includes but is not limited to: whether to accept that the terminal is to be connected to the service network selected by the terminal is determined according to subscription information of the terminal or a network configuration; and if it is accepted that the terminal is to be connected to the service network selected by the terminal, a subsequent step is performed.

Referring to the system shown in FIG. 1, the CSF may send the ID of the terminal and the connection selection information in the received connection selection request to the TGW, and the TGW determines, according to the subscription information of the terminal and a local network configuration (for example, whether to support and allow an NSWO, and whether to support and allow a connection to a PDN selected by the terminal), whether to accept that the terminal is to be connected to the service network selected by the terminal.

505. If determining to accept that the terminal is to be connected to the service network selected by the terminal, the gateway returns a connection selection acknowledgement response to the terminal.

This step is an optional step, and after the gateway determines to accept that the terminal is to be connected to the service network selected by the terminal, the gateway returns the connection selection acknowledgement response to the terminal.

It should be noted that user-plane management performed by the AC/BNG and the TGW on the terminal corresponds to a TWAG For example, after determining to accept that the terminal is to be connected to the service network selected by the terminal, the TGW or the AC/BNG sends the connection selection acknowledgement response to the CSF.

506: The terminal disconnects from the first WLAN, and accesses a second WLAN.

After receiving the connection selection acknowledgement response sent by the gateway, the terminal disconnects from the first WLAN, and accesses the second WLAN. When re-choosing to connect to the second WLAN, the terminal selects a second WLAN AP, and establishes an association with the second WLAN AP.

It should be noted that, because the terminal is already connected to the first WLAN corresponding to the first WLAN AP, when connecting to the second WLAN corresponding to the second WLAN AP, the terminal may further disconnect from the connected first WLAN corresponding to the first WLAN AP. If the CSF is to disconnect from the connected first WLAN corresponding to the first WLAN AP, the CSF may disconnect, after sending a connection selection reply to the CSF client, from the connected first WLAN corresponding to the first WLAN AP.

When the terminal is connected to a WLAN again this time, the WLAN AP associated for the last time may be selected, and the WLAN AP associated for the last time may be obtained according to a BSSID (basic service set identifier) that is stored in the CSF client and a MAC (Media Access Control) address of the WLAN AP, that is, the second WLAN AP is the same as the first WLAN AP, and the second WLAN is the same as the first WLAN. Optionally, the terminal may also select another WLAN AP that has a same SSID (service set identifier) as that of the WLAN corresponding to the WLAN AP associated for the last time, and the another WLAN AP may be obtained according to the BSSID stored in the CSF client. Alternatively, another AP that belongs to a same WLAN AP group as that of the WLAN AP associated for the last time may be determined according to a MAC address of a WLAN AP in any WLAN AP group corresponding to an HESSID (homogenous extended service set identifier), that is, the second WLAN AP is different from the first WLAN AP, and the second WLAN is different from the first WLAN.

Optionally, if the connection selection reply sent by the CSF to the CSF client carries a WLAN identifier (for example, an SSID, or a BSSID) indicated by a network, the terminal may be connected to a corresponding WLAN according to the identifier.

In the method provided in this embodiment of the present invention, when the terminal accesses the second WLAN, the terminal requests, from the gateway, to access the second WLAN corresponding to the second WLAN AP; the gateway performs authentication on the terminal; and if the authentication succeeds, the gateway performs authorization on the terminal, and the terminal accesses, by using the associated second WLAN AP, the WLAN corresponding to the second WLAN AP.

A process of performing authentication by the gateway on the terminal is the same as a process of performing authentication by the gateway on the terminal that requests to access the first WLAN corresponding to the first WLAN AP in step 501. For details, refer to content in step 501, and the details are not described herein again.

Moreover, when the gateway performs authentication and authorization on the terminal, the method further includes a step of sending a second terminal address to the terminal, so that a packet identified by using the second terminal address may be subsequently transmitted between the terminal and the second WLAN. For a terminal side, a process of receiving the second terminal address sent by the gateway is further included, so that a packet identified by using the second terminal address is subsequently transmitted to the second WLAN. For a packet identified by using the second terminal address, in an uplink direction between the terminal and the second WLAN, the second terminal address may be used as a source address of an IP header of a packet, and in a downlink direction between the terminal and the second WLAN, the second terminal address may be used as a destination address of an IP header of a packet.

It should be noted that the second terminal address sent by the gateway to the terminal may be a terminal address assigned by the gateway, or may be a terminal address obtained by the gateway by means of the DHCP; and a manner of obtaining the second terminal address by the gateway is not limited in this embodiment. Moreover, the second terminal address and the first terminal address sent by the gateway to the terminal may be the same or may be different, which is not specifically limited in this embodiment.

507: The gateway establishes a connection between the terminal and the service network selected by the terminal.

A manner of establishing, by the gateway, the connection between the terminal and the service network selected by the terminal is not specifically limited in this embodiment. During specific implementation, the gateway may determine, by querying the connection selection information carried in the connection selection request sent by the terminal, the service network selected by the terminal; moreover, in an optional embodiment, the gateway may further determine whether the connection selection context corresponding to the terminal is stored, and if the connection selection context corresponding to the terminal is stored, the service network selected by the terminal is determined according to the connection selection context corresponding to the terminal, and the connection between the terminal and the service network selected by the terminal is established.

After the gateway establishes the connection between the terminal and the service network selected by the terminal, to enable the terminal to access the service network, the gateway may further perform a step of assigning, to the terminal, a terminal address for accessing the service network selected by the terminal, and return, to the terminal, the terminal address for accessing the service network selected by the terminal, so that the terminal accesses, according to the terminal address for accessing the service network selected by the terminal, the service network selected by the terminal.

A manner of assigning, by the gateway to the terminal, the terminal address for accessing the service network selected by the terminal is not specifically limited in this embodiment. During specific implementation, the gateway may receive a DHCP request sent to the gateway by UE that has been authenticated, and the gateway adds, to a DHCP response according to the DHCP request, the terminal address that is assigned to the terminal to access the service network selected by the terminal, and returns the DHCP response to the terminal, so that the terminal accesses, according to the terminal address for accessing the service network selected by the terminal, the service network selected by the terminal.

If the terminal selects a PDN connection, and subscription information of the terminal and an operator policy allow the terminal to access a selected APN, that is, allow the terminal to connect to a PDN, the TGW selects a PGW/GGSN for the terminal according to the APN; and sends a Create Session Request to the PGW and sends a Create PDP Context Request to the GGSN, where the APN that the terminal chooses to connect to is used as an APN.

Before the TGW establishes a new PDN connection tunnel (where the tunnel is located between the TGW and the PGW/GGSN) for the UE, if a last connection of the UE is a PDN connection, the TGW may activate a tunnel of the last PDN connection, and release a resource (for example, an IP address). If the UE is connected to an NSWO for the last time, the AC/BNG or the TGW may release an NSWO resource (for example, an IP address) of the terminal.

Optionally, if the UE chooses to connect to an NSWO, a packet of the NSWO is routed by the AC/BNG through the CSF, but not through the TGW, the AC/BNG assigns an IP address to the terminal, that is, a terminal address for the terminal to access the service network selected by the terminal. The AC/BNG returns, to the terminal, the IP address that is assigned to the terminal and that is in a DHCP ACK, and an uplink packet sent by the terminal after the terminal is connected to the service network selected by the terminal is directly sent by the AC/BNG through the CSF.

If the UE chooses to connect to an NSWO, a packet of the NSWO is routed by the TGW, the TGW assigns an IP address to the terminal, that is, a terminal address for the terminal to access the service network selected by the terminal. The TGW returns, to the terminal, the IP address that is in a DHCP ACK, and an uplink packet sent by the terminal after the terminal is connected to the service network selected by the terminal is directly sent by the TGW.

If the UE chooses to connect to a PDN, the TGW returns a PDN address or a PDP address that is in a DHCP ACK to the terminal. When a PGW is accessed, a PDN address is returned; and when a GGSN is accessed, a PDP address is returned.

After connecting to the service network selected by the terminal, the terminal may send an uplink packet to the service network selected by the terminal, and receive a downlink packet sent by the service network selected by the terminal, to access a service of a PDN or a service of an NSWO selected by the terminal. When the NSWO is on the AC/BNG, a downlink IP packet enters a network through the AC/BNG, and is sent to the terminal; and when the NSWO is on the TGW, a downlink IP packet enters a network through the TGW, and is sent to the terminal.

It should be noted that, if the terminal needs to select the connection selection information again to connect to another service network selected by the terminal, the process of step 501 to step 507 may be performed again, so that the terminal is connected to the service network selected by the terminal.

Figure 7:
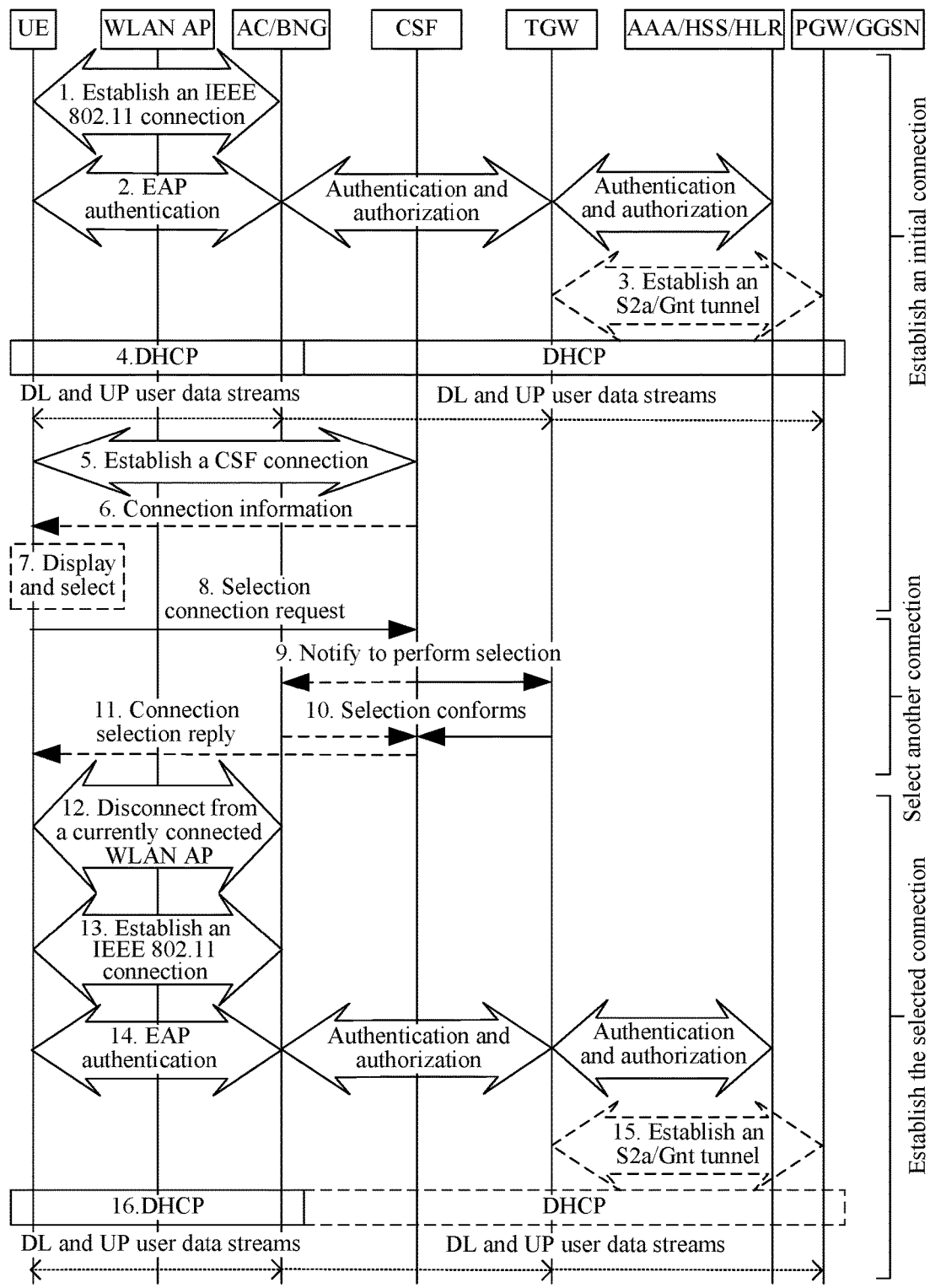
FIG. 7 is a flowchart of connecting to a network according to another embodiment of the present invention.

Moreover, a process of establishing a network connection by each device in the system shown in FIG. 1 may correspond to a flowchart shown in FIG. 7. Step 1 to step 7 in FIG. 7 correspond to content of step 501, step 8 corresponds to content of step 502, step 9 to step 11 correspond to content of step 503 to step 505, and step 12 to step 16 correspond to content of step 506 and step 507.

In an optional embodiment, in the system shown in FIG. 1, the CSF may be further located in a PDN network, or located in an NSWO network (for example, the Internet). The terminal queries a DNS (domain name service) server by using a domain name of the CSF, to obtain an IP address of the CSF in the PDN or the Internet, and establish a connection.

According to the method provided in this embodiment, a connection selection request that includes connection selection information and that is sent by a terminal is received by using an established user plane connection to the terminal, and after a service network selected by the terminal is determined according to the connection selection information, a connection between the terminal and the service network selected by the terminal is established. In this way, the terminal can connect to different service networks, so that a network connection manner becomes more flexible, interaction between the terminal and a gateway is simplified, and a network connection range is expanded.

Figure 8:
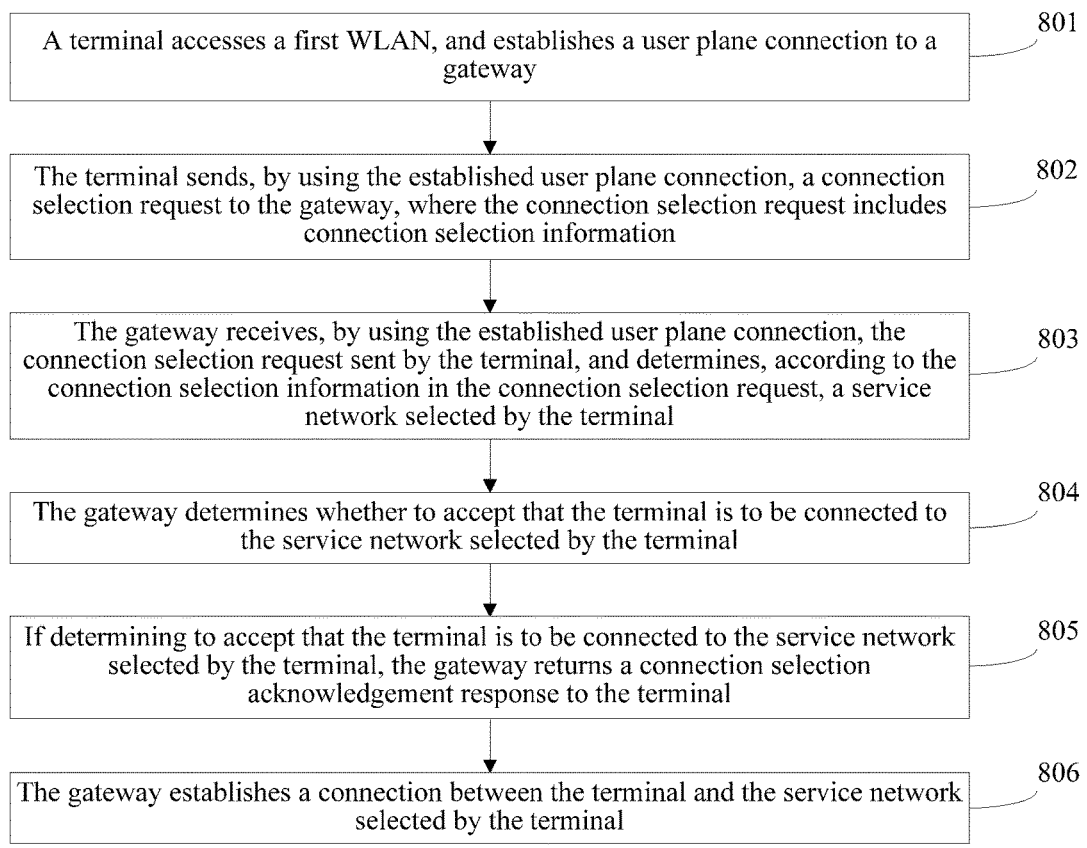
FIG. 8 is a flowchart of connecting to a network according to another embodiment of the present invention.

An embodiment of the present invention provides a method for establishing a network connection, and the method provided in this embodiment of the present invention is described in detail by using the system shown in FIG. 2. Referring to FIG. 8, a process of the method includes:

801: A terminal accesses a first WLAN, and establishes a user plane connection to a gateway.

For an implementation manner of accessing the first WLAN by the terminal, and establishing the user plane connection to the gateway in this step, refer to the content of accessing the first WLAN by the terminal, and establishing the user plane connection to the gateway in step 501 in the previous embodiment, and details are not described herein again. A difference from step 501 is that when the terminal accesses the TWAN for the first time, the TWAG assigns an IP address to the terminal, where the IP address may be a public network address or a local network address that belongs to an AC/BNG/TGW address domain, or may be a PDN address obtained for the terminal when a default PDN connection (or a first PDN connection) is established for the terminal.

Moreover, because the system shown in FIG. 2 includes an NAT entity, after the gateway assigns, to the terminal, the first terminal address and the terminal address for accessing the initial service network, the gateway transmits, by means of network address translation or network address and port translation and between the terminal and the initial service network, a packet identified by using the first terminal address and a packet identified by using the terminal address for accessing the initial service network.

802: The terminal sends, by using the established user plane connection, a connection selection request to the gateway, where the connection selection request includes connection selection information.

An implementation manner of sending, by the terminal, the connection selection request to the gateway by using the established user plane connection in this step is the same as the implementation manner of sending, by the terminal, the connection selection request to the gateway by using the established user plane connection in step 502 in the previous embodiment. For details, refer to content in step 502 in the previous embodiment, and the details are not described herein again.

803: The gateway receives, by using the established user plane connection, the connection selection request sent by the terminal, and determines, according to the connection selection information in the connection selection request, a service network selected by the terminal.

An implementation manner of this step is the same as the implementation manner in step 503 in the previous embodiment. For details, refer to content in step 503 in the previous embodiment, and the details are not described herein again.

804: The gateway determines whether to accept that the terminal is to be connected to the service network selected by the terminal.

An implementation manner of this step is the same as the implementation manner in step 504 in the previous embodiment. For details, refer to content in step 504 in the previous embodiment, and the details are not described herein again.

805. If determining to accept that the terminal is to be connected to the service network selected by the terminal, the gateway returns a connection selection acknowledgement response to the terminal.

An implementation manner of returning, by the gateway, the connection selection acknowledgement response to the terminal in this step is the same as the implementation manner of returning, by the gateway, the connection selection acknowledgement response to the terminal in step 505 in the previous embodiment. For details, refer to content in step 505 in the previous embodiment, and the details are not described herein again.

It should be noted that, a difference from the content in step 505 in the foregoing embodiment is that in this step provided in this embodiment, after receiving the connection selection acknowledgement response returned by the gateway, the terminal does not need to disconnect from the first WLAN.

806: The gateway establishes a connection between the terminal and the service network selected by the terminal.

A manner of establishing, by the gateway, the connection between the terminal and the service network selected by the terminal is not specifically limited in this embodiment. During specific implementation, the gateway may determine, by querying the connection selection information carried in the connection selection request sent by the terminal, the service network selected by the terminal; moreover, in an optional embodiment, the gateway may further determine whether the connection selection context corresponding to the terminal is stored, and if the connection selection context corresponding to the terminal is stored, the service network selected by the terminal is determined according to the connection selection context corresponding to the terminal, and the connection between the terminal and the service network selected by the terminal is established.

After the gateway establishes the connection between the terminal and the service network selected by the terminal, to enable the terminal to access the service network, the gateway may further perform a step of assigning, to the terminal, a terminal address for accessing the service network selected by the terminal, and return, to the terminal, the terminal address for accessing the service network selected by the terminal, so that the terminal accesses, according to the terminal address for accessing the service network selected by the terminal, the service network selected by the terminal.

A manner of assigning, by the gateway to the terminal, the terminal address for accessing the service network selected by the terminal is not specifically limited in this embodiment. During specific implementation, the gateway may receive a DHCP request sent to the gateway by UE that has been authenticated, and the gateway adds, to a DHCP response according to the DHCP request, the terminal address that is assigned to the terminal to access the service network selected by the terminal, and returns the DHCP response to the terminal, so that the terminal accesses, according to the terminal address for accessing the service network selected by the terminal, the service network selected by the terminal.

Referring to the system shown in FIG. 2, if the connection selection information sent by the terminal to the gateway by using the established user plane connection indicates to choose to connect to a PDN, and subscription information of the terminal and an operator policy allow the terminal to access the selected PDN by using a first APN, the TGW selects a PGW/GGSN for the terminal according to the APN; and sends a Create Session Request to the PGW if the PGW is selected and sends a Create PDP Context Request to the GGSN if the GGSN is selected, where the APN that the terminal chooses to connect to is used as an APN in a request. The PGW returns a PDN address by sending a Create Session Response to the TGW, and the GGSN returns a PDP address by sending a Create PDP Context Response to the TGW.

It should be noted that, because the structure of the system provided in this embodiment further includes an NAT entity, when the terminal sends uplink data to the service network selected by the terminal, the NAT entity performs NAT/NAPT (network address port translation) translation (before translation, an address is an address assigned by the TWAG and after translation, an address is an address assigned by the PGW/GGSN) for the terminal, and sends an address to the PGW/GGSN. When the terminal sends downlink data, the NAT entity performs reverse translation for the terminal, and sends an address to the terminal.

If the terminal chooses to connect to an NSWO, and subscription information of the terminal and an operator policy allow the terminal to connect to the NSWO, when the TWAG assigns a public network address to the terminal, the AC/BNG or the TGW directly sends an uplink packet of the terminal. When the TWAG assigns a local network address to the terminal, the AC/BNG or the TGW performs address translation (before translation, an address is the local network address assigned by the TWAG, and after translation, an address is an address of an AC/BNG address domain or a TGW address domain) on a packet by means of the NAT entity in a manner similar to that of the PDN connection, and sends an uplink packet.

It should be noted that, if the terminal needs to select the connection selection information again to connect to another service network selected by the terminal, the process of step 801 to step 806 may be performed again, so that the terminal is connected to the service network selected by the terminal.

Figure 9:
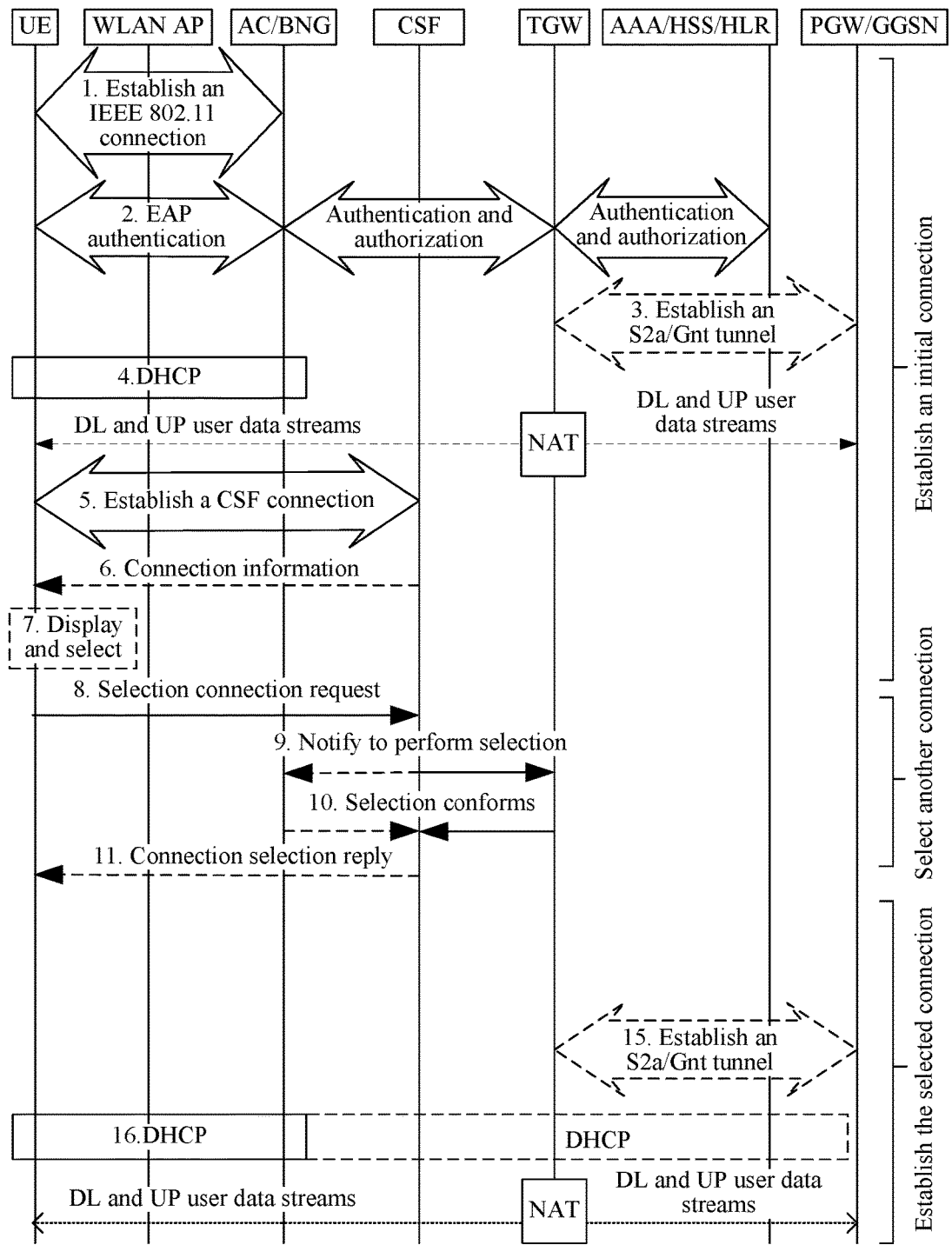
FIG. 9 is a flowchart of connecting to a network according to another embodiment of the present invention.

Moreover, a process of establishing a network connection by each device in the system shown in FIG. 2 may correspond to a flowchart of connecting to a network shown in FIG. 9. Step 1 to step 7 in FIG. 9 correspond to content of step 801, step 8 corresponds to content of step 802, step 9 to step 11 correspond to content of step 803 to step 805, and step 15 to step 16 correspond to content of step 806.

According to the method provided in this embodiment of the present invention, a connection selection request that includes connection selection information and that is sent by a terminal is received by using an established user plane connection to the terminal, and after a service network selected by the terminal is determined according to the connection selection information, a connection between the terminal and the service network selected by the terminal is established. In this way, the terminal can connect to different service networks, so that a network connection manner becomes more flexible, interaction between the terminal and a gateway is simplified, and a network connection range is expanded.

Figure 10:
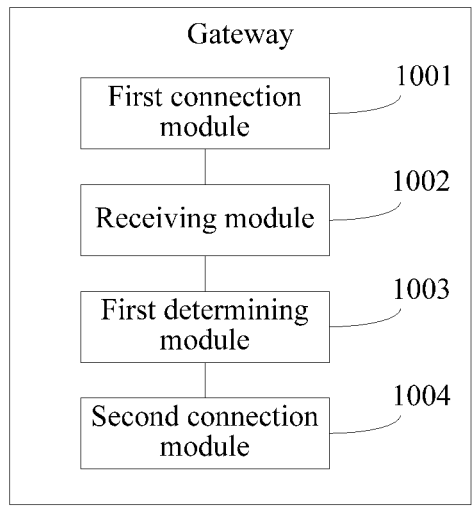
FIG. 10 is a schematic structural diagram of a gateway according to another embodiment of the present invention.

Referring to FIG. 10, an embodiment of the present invention provides a gateway, where the gateway is configured to perform the method performed by a gateway in the method for establishing a network connection provided in the embodiment shown in FIG. 3, FIG. 5, or FIG. 8, and the gateway includes:

a first connection module 1001, configured to establish a user plane connection to a terminal, where the terminal accesses a first WLAN;

a receiving module 1002, configured to receive, by using the established user plane connection, a connection selection request sent by the terminal, where the connection selection request includes connection selection information;

a first determining module 1003, configured to determine, according to the connection selection information in the connection selection request, a service network selected by the terminal; and a second connection module 1004, configured to establish a connection between the terminal and the service network selected by the terminal.

Figure 11:
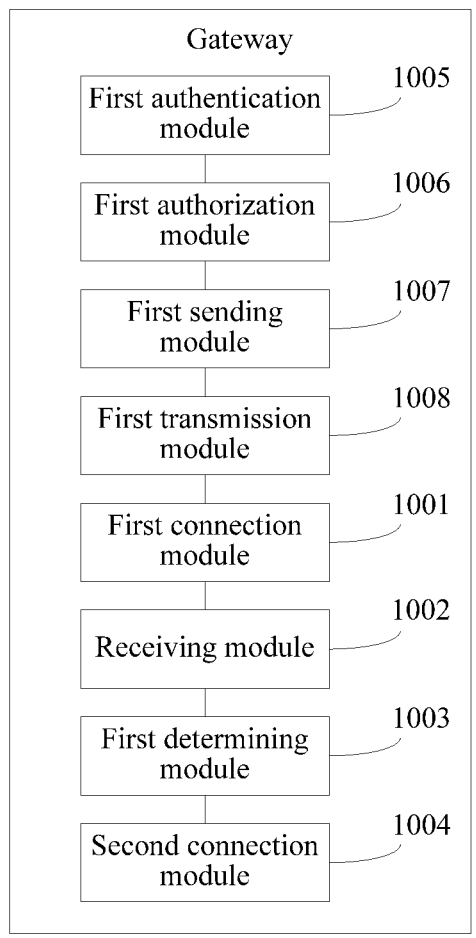
FIG. 11 is a schematic structural diagram of a gateway according to another embodiment of the present invention.

In an optional embodiment, referring to FIG. 11, the gateway further includes:

a first authentication module 1005, configured to perform authentication on the terminal that requests to access the first WLAN that corresponds to a first WLAN AP;

a first authorization module 1006, configured to: when the authentication succeeds, perform authorization on the terminal;

a first sending module 1007, configured to send a first terminal address to the terminal, so that the terminal accesses the first WLAN corresponding to the first WLAN AP; and a first transmission module 1008, configured to transmit, between the terminal and the first WLAN, a packet identified by using the first terminal address.

Figure 12:
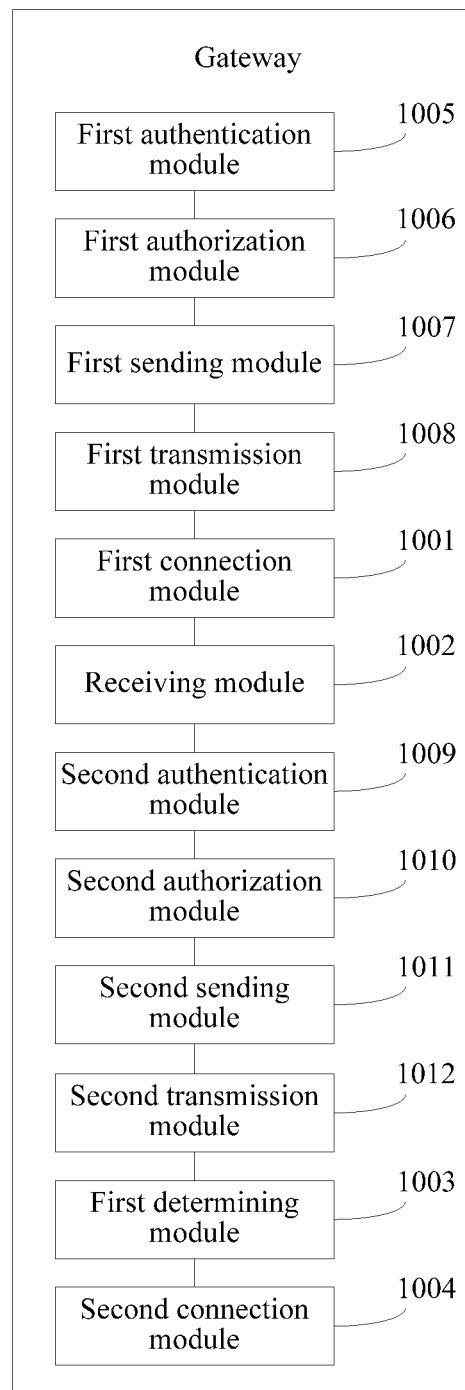
FIG. 12 is a schematic structural diagram of a gateway according to another embodiment of the present invention.

In an optional embodiment, referring to FIG. 12, the gateway further includes:

a second authentication module 1009, configured to: when the terminal disconnects from the first WLAN corresponding to a first WLAN AP, and re-chooses to access a second WLAN corresponding to a second WLAN AP, perform authentication on the terminal;

a second authorization module 1010, configured to: when the authentication succeeds, perform authorization on the terminal;

a second sending module 1011, configured to send a second terminal address to the terminal, so that the terminal accesses the second WLAN corresponding to the second WLAN AP;

and a second transmission module 1012, configured to transmit, between the terminal and the second WLAN, a packet identified by using the second terminal address.

Figure 13:
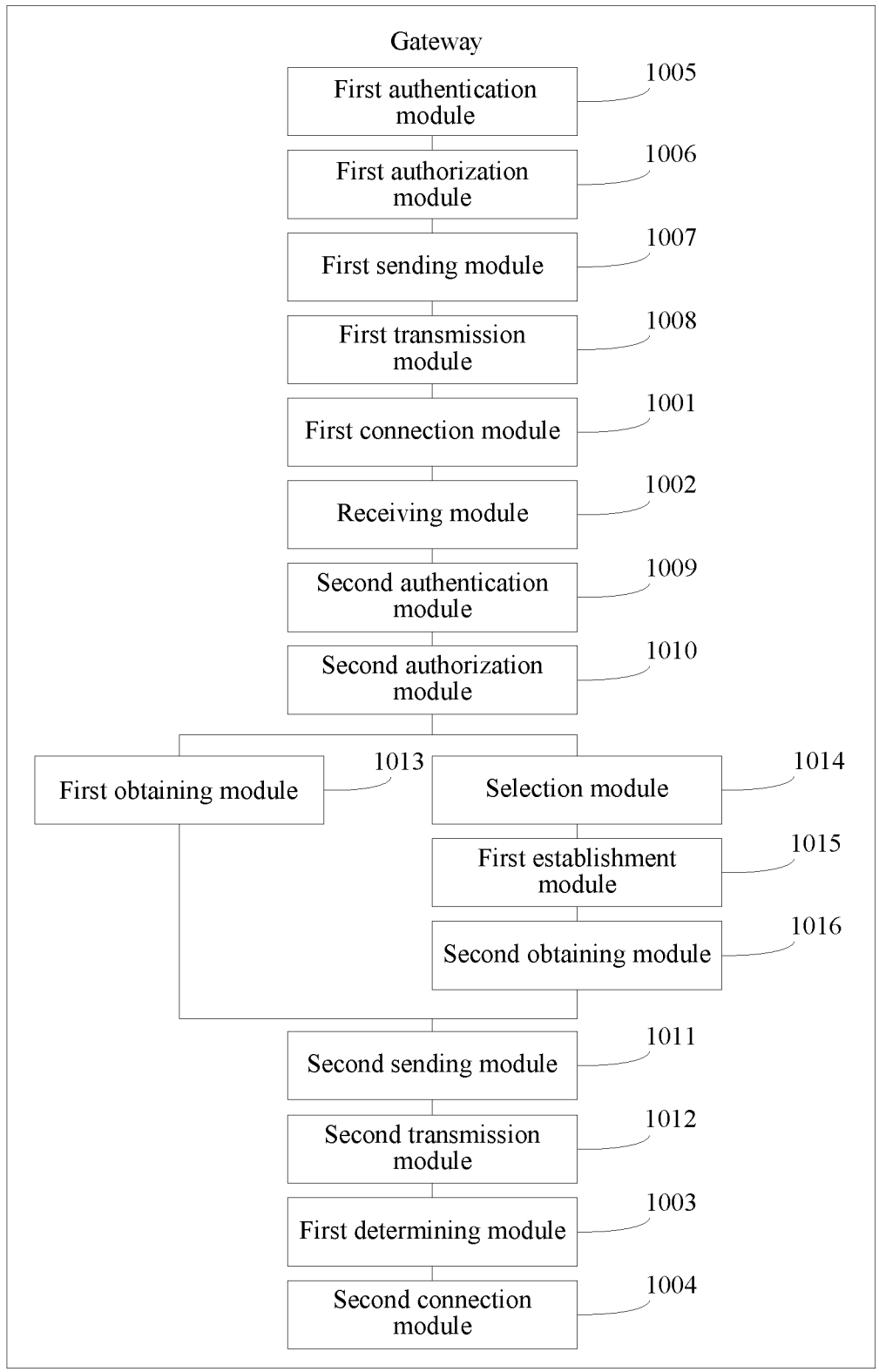
FIG. 13 is a schematic structural diagram of a gateway according to another embodiment of the present invention.

In an optional embodiment, referring to FIG. 13, the gateway further includes:

a first obtaining module 1013, configured to obtain, from an initial service network, a terminal address that is assigned to the terminal to access the initial service network; or a selection module 1014, configured to select a PGW or a GGSN for the terminal according to subscription information of the terminal; a first establishment module 1015, configured to establish a bearer to the PGW or the GGSN; and a second obtaining module 1016, configured to obtain, from the PGW or the GGSN, a terminal address that is assigned to the terminal to access an initial service network.

Figure 14:
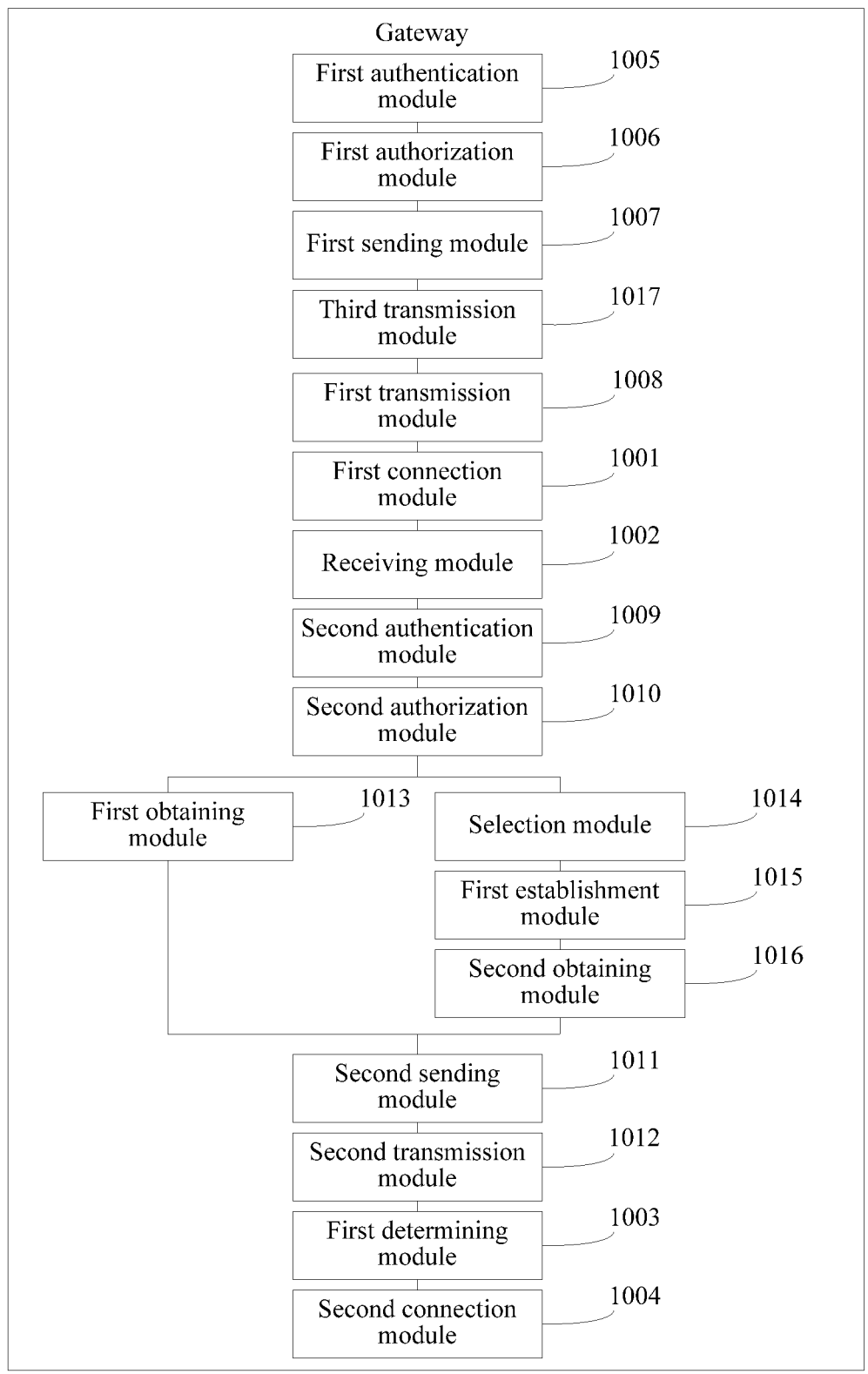
FIG. 14 is a schematic structural diagram of a gateway according to another embodiment of the present invention.

In an optional embodiment, referring to FIG. 14, the gateway further includes:

a third transmission module 1017, configured to transmit, by means of network address translation or network address and port translation and between the terminal and the initial service network, a packet identified by using the first terminal address and a packet identified by using the terminal address for accessing the initial service network.

Figure 15:
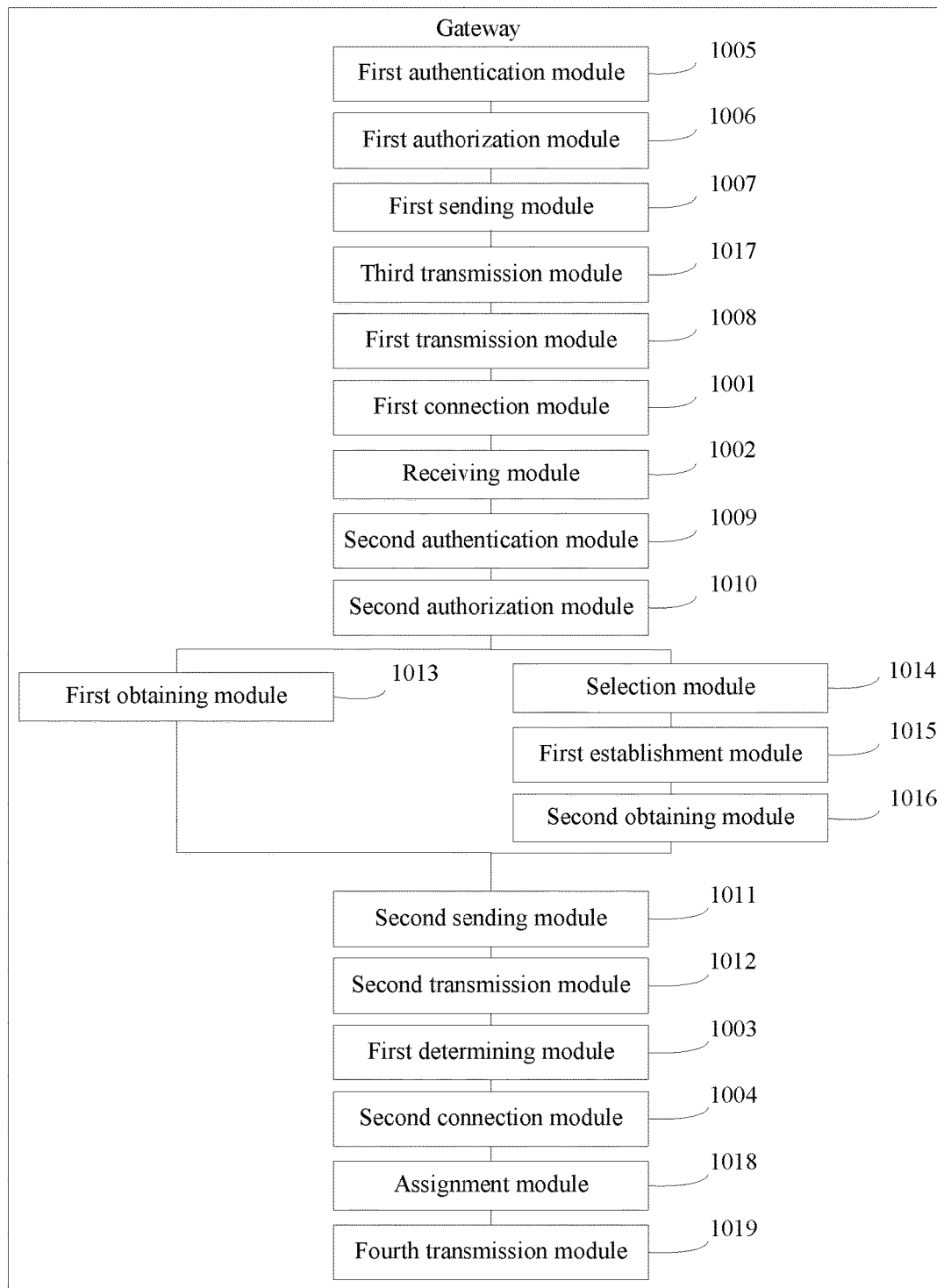
FIG. 15 is a schematic structural diagram of a gateway according to another embodiment of the present invention.

In an optional embodiment, referring to FIG. 15, the gateway further includes:

an assignment module 1018, configured to assign, to the terminal, a terminal address for accessing the service network selected by the terminal; and a fourth transmission module 1019, configured to transmit, by means of network address translation or network address and port translation and between the terminal and the service network selected by the terminal, a packet identified by using the first terminal address and a packet identified by using the terminal address for accessing the service network selected by the terminal.

Figure 16:
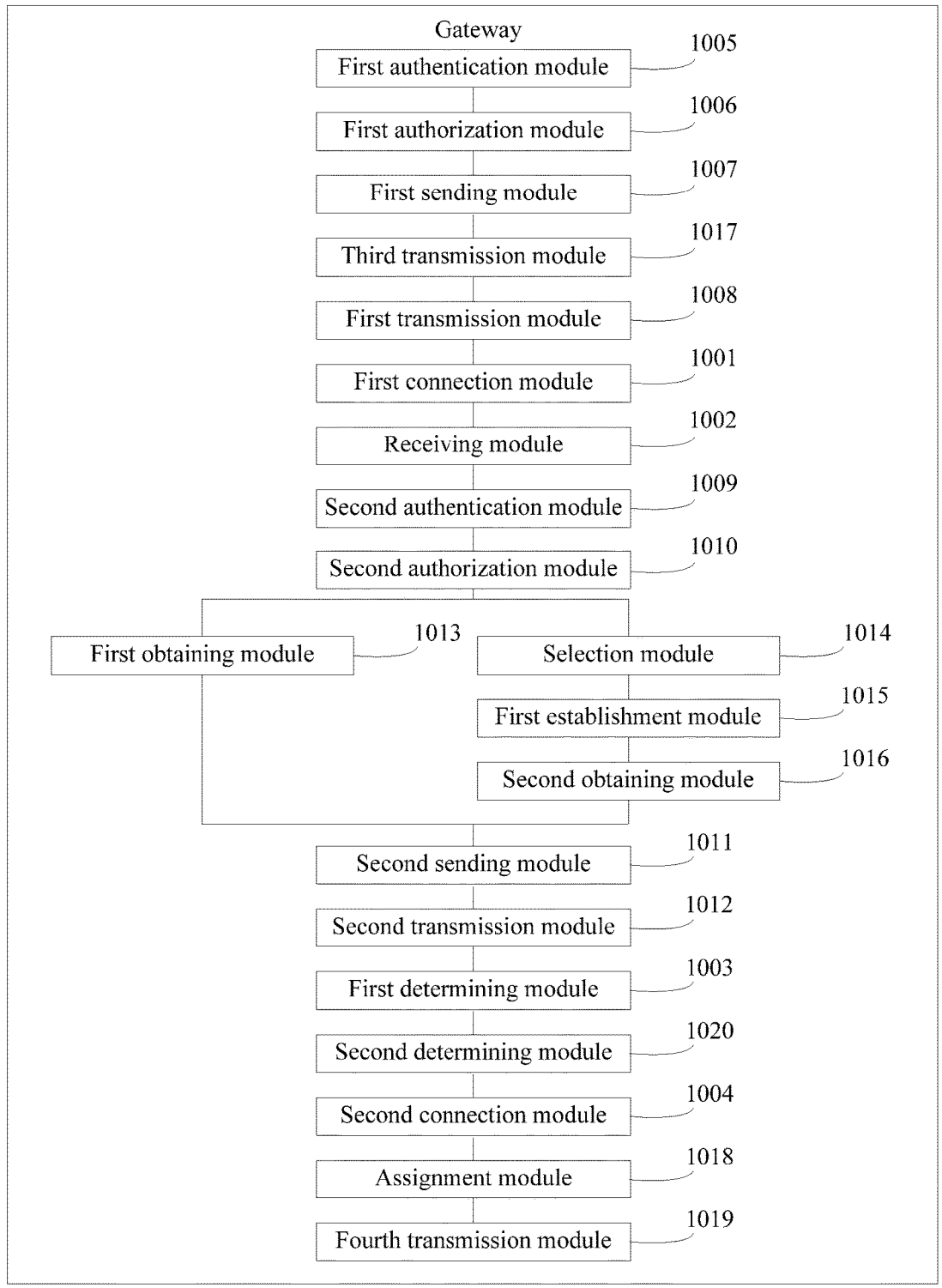
FIG. 16 is a schematic structural diagram of a gateway according to another embodiment of the present invention.

In an optional embodiment, referring to FIG. 16, the gateway further includes:

a second determining module 1020, configured to determine, according to subscription information of the terminal or a network configuration, whether to accept that the terminal is to be connected to the service network; and a second connection module 1004, configured to: when it is accepted that the terminal is to be connected to the service network, perform the step of establishing a connection between the terminal and the service network selected by the terminal.

In an optional embodiment, the receiving module 1002 is configured to: send, to the terminal by using the established user plane connection, connection information that includes selectable connection selection information, and receive, by using the established user plane connection, the connection selection request sent by the terminal according to the connection information; or the receiving module 1002 is configured to receive, by using the established user plane connection, the connection selection request sent by the terminal according to preconfigured connection selection information.

Figure 17:
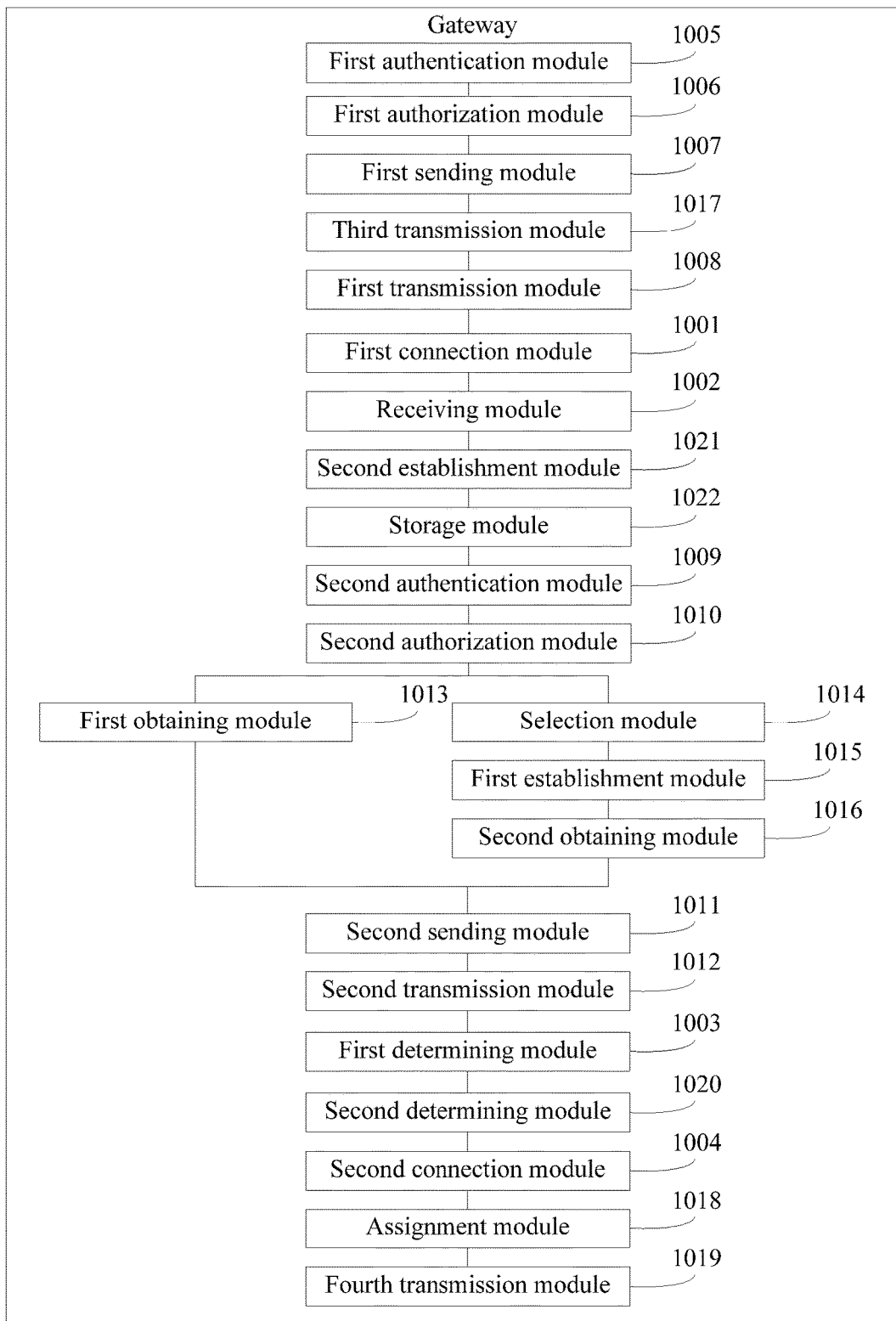
FIG. 17 is a schematic structural diagram of a gateway according to another embodiment of the present invention.

In an optional embodiment, referring to FIG. 17, the gateway further includes:

a second establishment module 1021, configured to establish, according to the connection selection request, a connection selection context corresponding to the terminal, where the connection selection context includes at least an identifier of the terminal, the service network selected by the terminal, and the connection information; and a storage module 1022, configured to store the connection selection context.

In an optional embodiment, the storage module 1022 is configured to store the connection selection context within preset validity duration.

Figure 18:
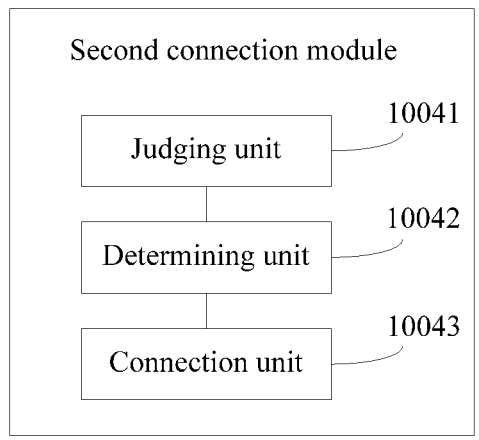
FIG. 18 is a schematic structural diagram of a second connection module according to another embodiment of the present invention.

In an optional embodiment, referring to FIG. 18, the second connection module 1004 includes:

a judging unit 10041, configured to determine whether the connection selection context corresponding to the terminal is stored;

a determining unit 10042, configured to: when the connection selection context corresponding to the terminal is stored, determine, according to the connection selection context corresponding to the terminal, the service network selected by the terminal; and a connection unit 10043, configured to establish the connection between the terminal and the service network selected by the terminal.

The gateway provided in this embodiment of the present invention receives, by using an established user plane connection to a terminal, a connection selection request that includes connection selection information and that is sent by the terminal, and after a service network selected by the terminal is determined according to the connection selection information, establishes a connection between the terminal and the service network selected by the terminal. In this way, the terminal can connect to different service networks, so that a network connection manner becomes more flexible, interaction between the terminal and a gateway is simplified, and a network connection range is expanded.

Figure 19:
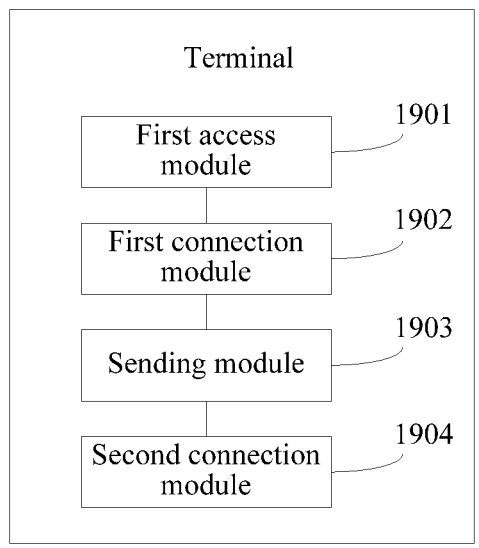
FIG. 19 is a schematic structural diagram of a terminal according to another embodiment of the present invention.

Referring to FIG. 19, an embodiment of the present invention provides a terminal, where the terminal is configured to perform the method performed by the terminal in the method for establishing a network connection provided in the embodiment shown in FIG. 4, FIG. 5, or FIG. 8, and includes:

a first access module 1901, configured to access a first WLAN;

a first connection module 1902, configured to establish a user plane connection to a gateway;

a sending module 1903, configured to send, by using the established user plane connection, a connection selection request to the gateway, where the connection selection request includes connection selection information; and a second connection module 1904, configured to establish, by using the gateway, a connection to a service network corresponding to the connection selection information in the connection selection request.

Figure 20:
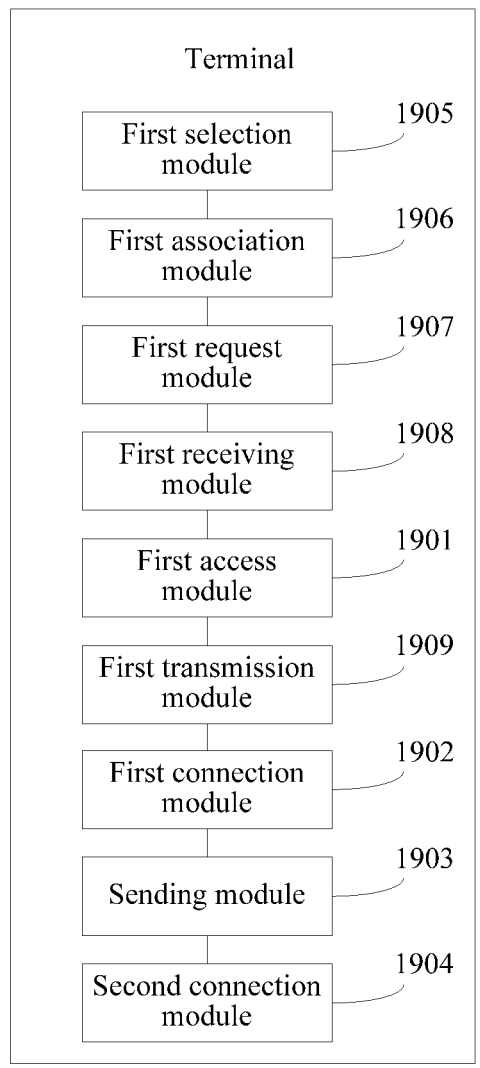
FIG. 20 is a schematic structural diagram of a terminal according to another embodiment of the present invention.

In an optional embodiment, referring to FIG. 20, the terminal further includes:

a first selection module 1905, configured to select a first WLAN AP;

a first association module 1906, configured to establish an association with the first WLAN AP;

a first request module 1907, configured to request, from the gateway, to access the first WLAN corresponding to the first WLAN AP;

a first receiving module 1908, configured to: after the gateway successfully performs authentication and authorization, receive a first terminal address sent by the gateway, where the first access module 1901 is configured to access, by using the associated first WLAN AP, the first WLAN corresponding to the first WLAN AP; and a first transmission module 1909, configured to transmit, to the first WLAN, a packet identified by using the first terminal address.

Figure 21:
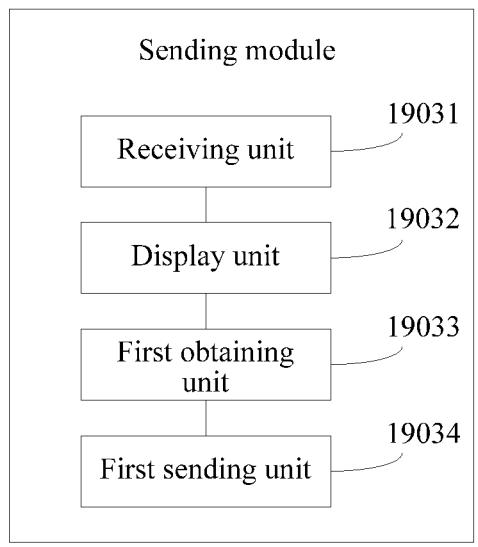
FIG. 21 is a schematic structural diagram of a sending module according to another embodiment of the present invention.

In an optional embodiment, referring to FIG. 21, the sending module 1903 includes:

a receiving unit 19031, configured to receive connection information that is sent by the gateway by using the established user plane connection and that includes selectable connection selection information;

a display unit 19032, configured to display the received connection information on a user interface;

a first obtaining unit 19033, configured to obtain connection selection information selected by a user by using the user interface; and a first sending unit 19034, configured to send, to the gateway by using the established user plane connection, the connection selection request that includes the connection selection information selected by the user.

Figure 22:
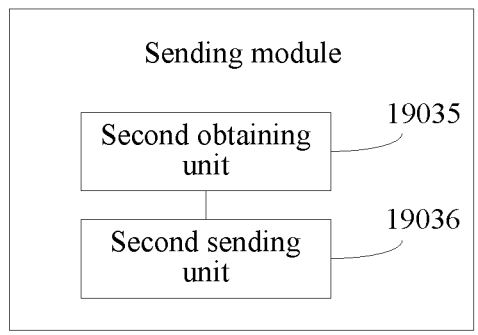
FIG. 22 is a schematic structural diagram of a sending module according to another embodiment of the present invention.

In an optional embodiment, referring to FIG. 22, the sending module 1903 includes:

a second obtaining unit 19035, configured to obtain preconfigured connection selection information by using a user interface; and a second sending unit 19036, configured to send, to the gateway by using the established user plane connection, the connection selection request that includes the preconfigured connection selection information.

Figure 23:
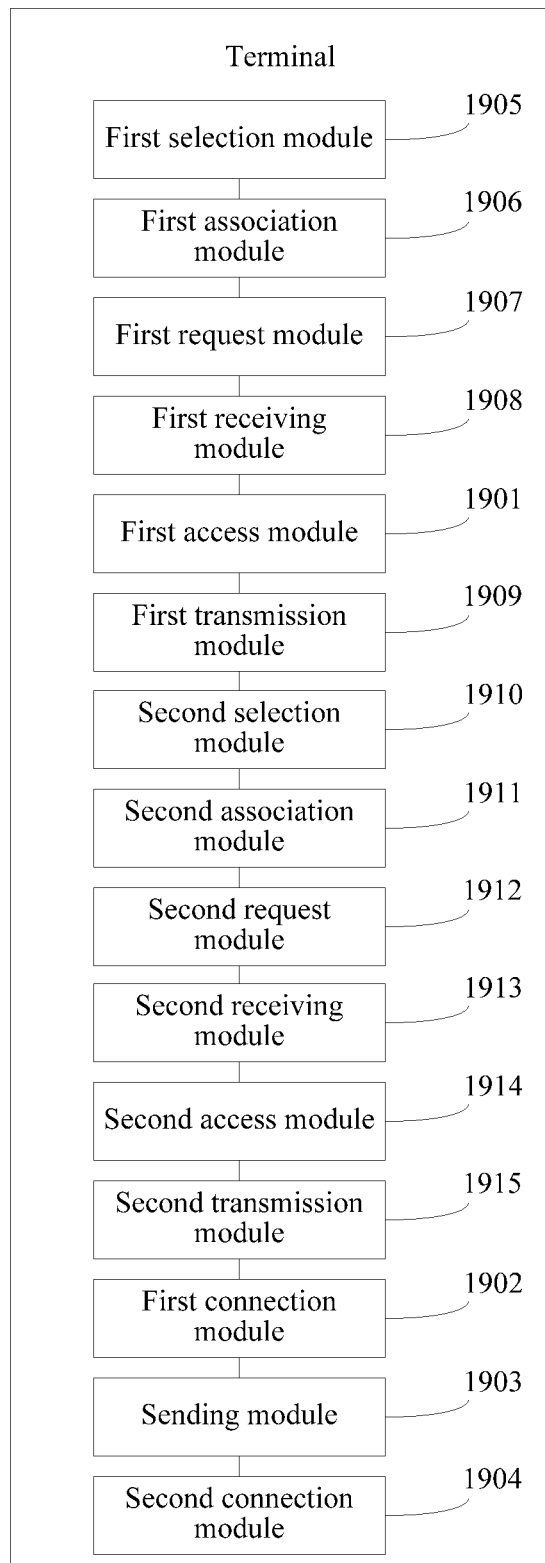
FIG. 23 is a schematic structural diagram of a terminal according to another embodiment of the present invention.

In an optional embodiment, referring to FIG. 23, the terminal further includes:

a second selection module 1910, configured to select a second WLAN AP;

a second association module 1911, configured to establish an association with the second WLAN AP;

a second request module 1912, configured to request, from the gateway, to access a second WLAN corresponding to the second WLAN AP;

a second receiving module 1913, configured to: after the gateway successfully performs authentication and authorization, receive a second terminal address sent by the gateway;

a second access module 1914, configured to access, by using the associated second WLAN AP, the second WLAN corresponding to the second WLAN AP; and a second transmission module 1915, configured to transmit, to the second WLAN, a packet identified by using the second terminal address.

The terminal provided in this embodiment of the present invention sends, by using an established user plane connection to a network side, a connection selection request that includes connection selection information to a gateway, so that after determining, according to the connection selection information, a service network selected by the terminal, the gateway establishes a connection between the terminal and the service network selected by the terminal. In this way, the terminal can connect to different service networks, so that a network connection manner becomes more flexible, interaction between the terminal and a gateway is simplified, and a network connection range is expanded.

An embodiment of the present invention provides a gateway, where the gateway is configured to perform the method performed by the gateway in the method for establishing a network connection provided in the embodiment shown in FIG. 3, FIG. 5, or FIG. 8, and includes a processor and a receiver.

The processor is configured to establish a user plane connection to a terminal, where the terminal accesses a first WLAN;

the receiver is configured to receive, by using the established user plane connection, a connection selection request sent by the terminal, where the connection selection request includes connection selection information;

the processor is configured to determine, according to the connection selection information in the connection selection request, a service network selected by the terminal; and the processor is configured to establish the connection between the terminal and the service network selected by the terminal.

In an optional embodiment, the processor is further configured to perform authentication on the terminal that requests to access the first WLAN that corresponds to a first WLAN AP;

the processor is further configured to: if authentication succeeds, perform authorization on the terminal;

the gateway further includes a transmitter;

the transmitter is configured to send a first terminal address to the terminal, so that the terminal accesses the first WLAN corresponding to the first WLAN AP; and the processor is configured to transmit, between the terminal and the first WLAN, a packet identified by using the first terminal address.

In an optional embodiment, the processor is further configured to: when the terminal disconnects from the first WLAN corresponding to a first WLAN AP, and re-chooses to access a second WLAN corresponding to a second WLAN AP, perform authentication on the terminal;

the processor is further configured to: if authentication succeeds, perform authorization on the terminal, so that the terminal accesses the second WLAN corresponding to the second WLAN AP;

the transmitter is further configured to send a second terminal address to the terminal; and the processor is further configured to transmit, between the terminal and the second WLAN, a packet identified by using the second terminal address.

In an optional embodiment, the processor is further configured to obtain, from an initial service network, a terminal address that is assigned to the terminal to access the initial service network; or the processor is further configured to select a PGW or a GGSN for the terminal according to subscription information of the terminal, and establish a bearer to the PGW or the GGSN; and the processor is further configured to obtain, from the PGW or the GGSN, a terminal address that is assigned to the terminal to access an initial service network.

In an optional embodiment, the processor is further configured to transmit, by means of network address translation or network address and port translation and between the terminal and the initial service network, a packet identified by using the first terminal address and a packet identified by using the terminal address for accessing the initial service network.

In an optional embodiment, the processor is further configured to assign, to the terminal, a terminal address for accessing the service network selected by the terminal; and the processor is further configured to transmit, by means of network address translation or network address and port translation and between the terminal and the service network selected by the terminal, a packet identified by using the first terminal address and a packet identified by using the terminal address for accessing the service network selected by the terminal.

In an optional embodiment, the processor is further configured to determine, according to subscription information of the terminal or a network configuration, whether to accept that the terminal is to be connected to the service network; and the processor is further configured to: when it is accepted that the terminal is to be connected to the service network, perform the step of establishing a connection between the terminal and the service network selected by the terminal.

In an optional embodiment, the transmitter is further configured to send, to the terminal by using the established user plane connection, connection information that includes selectable connection selection information; and the receiver is further configured to receive, by using the established user plane connection, the connection selection request sent by the terminal according to the connection information; or the receiver is further configured to receive, by using the established user plane connection, the connection selection request sent by the terminal according to preconfigured connection selection information.

In an optional embodiment, the processor is further configured to establish, according to the connection selection request, a connection selection context corresponding to the terminal, where the connection selection context includes at least an identifier of the terminal, the service network selected by the terminal, and the connection information; and the processor is further configured to store the connection selection context.

In an optional embodiment, the processor is further configured to store the connection selection context within preset validity duration.

In an optional embodiment, the processor is further configured to determine whether the connection selection context corresponding to the terminal is stored; and the processor is further configured to: when the connection selection context corresponding to the terminal is stored, determine, according to the connection selection context corresponding to the terminal, the service network selected by the terminal, and establish the connection between the terminal and the service network selected by the terminal.

The gateway provided in this embodiment receives, by using an established user plane connection to a terminal, a connection selection request that includes connection selection information and that is sent by the terminal, and after a service network selected by the terminal is determined according to the connection selection information, establishes a connection between the terminal and the service network selected by the terminal. In this way, the terminal can connect to different service networks, so that a network connection manner becomes more flexible, interaction between the terminal and a gateway is simplified, and a network connection range is expanded.

An embodiment of the present invention provides a terminal, where the terminal is configured to perform the method performed by the terminal in the method for establishing a network connection provided in the embodiment shown in FIG. 4, FIG. 5, or FIG. 8, and includes a processor and a transmitter.

The processor is configured to access a first WLAN, and establish a user plane connection to a gateway;

the transmitter is configured to send, by using the established user plane connection, a connection selection request to the gateway, where the connection selection request includes connection selection information; and the processor is configured to establish, by using the gateway, a connection to a service network corresponding to the connection selection information in the connection selection request.

In an optional embodiment, the processor is further configured to: select a first WLAN AP, and establish an association with the first WLAN AP;

the processor is further configured to request, from the gateway, to access the first WLAN corresponding to the first WLAN AP;

the terminal further includes a receiver;

the receiver is configured to: after the gateway successfully performs authentication and authorization, receive a first terminal address sent by the gateway; and the processor is further configured to access, by using the associated first WLAN AP, the first WLAN corresponding to the first WLAN AP, and transmit, to the first WLAN, a packet identified by using the first terminal address.

In an optional embodiment, the receiver is further configured to receive connection information that is sent by the gateway by using the established user plane connection and that includes selectable connection selection information;

the processor is further configured to display the received connection information on a user interface, and obtain connection selection information selected by a user by using the user interface; and the transmitter is further configured to send, to the gateway by using the established user plane connection, the connection selection request that includes the connection selection information selected by the user.

In an optional embodiment, the processor is further configured to obtain preconfigured connection selection information by using a user interface; and the transmitter is further configured to send, to the gateway by using the established user plane connection, the connection selection request that includes the preconfigured connection selection information.

In an optional embodiment, the processor is further configured to: select a second WLAN AP, and establish an association with the second WLAN AP;

the processor is further configured to request, from the gateway, to access a second WLAN corresponding to the second WLAN AP;

the receiver is further configured to: after the gateway successfully performs authentication and authorization, receive a second terminal address sent by the gateway; and the processor is further configured to access, by using the associated second WLAN AP, the second WLAN corresponding to the second WLAN AP, and transmit, to the second WLAN, a packet identified by using the second terminal address.

The terminal provided in this embodiment of the present invention establishes a user plane connection to a network side, and sends, by using the user plane connection, a connection selection request that includes connection selection information to a gateway, so that after determining, according to the connection selection information, a service network selected by the terminal, the gateway establishes a connection between the terminal and the service network selected by the terminal. In this way, the terminal can connect to different service networks, so that a network connection manner becomes more flexible, interaction between the terminal and a gateway is simplified, and a network connection range is expanded.

Figure 24:
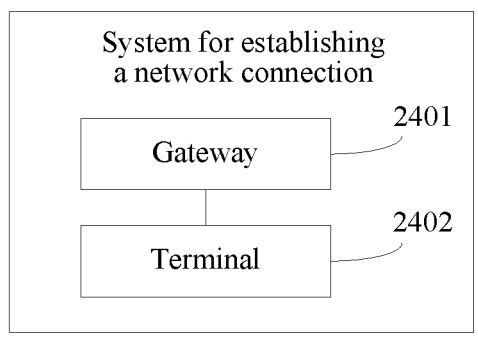
FIG. 24 is a schematic structural diagram of a system for establishing a network connection according to another embodiment of the present invention.

Referring to FIG. 24, an embodiment of the present invention provides a system for establishing a network connection, where the system includes a gateway 2401 and at least one terminal 2402. The gateway 2401 is the gateway shown in any one of FIG. 10 to FIG. 17, and the terminal 2402 is the terminal shown in FIG. 19, FIG. 20, or FIG. 23. For details, refer to the gateways shown in FIG. 10 to FIG. 17 and the terminals shown in FIG. 19, FIG. 20, and FIG. 23, and the details are not described herein again.

The system provided in this embodiment receives, by using an established user plane connection to a terminal, a connection selection request that includes connection selection information and that is sent by the terminal, and after a service network selected by the terminal is determined according to the connection selection information, establishes a connection between the terminal and the service network selected by the terminal. In this way, the terminal can connect to different service networks, so that a network connection manner becomes more flexible, interaction between the terminal and a gateway is simplified, and a network connection range is expanded.

It should be noted that when a terminal and a gateway provided in the embodiments establish a network connection, description is made only through examples of division of the functional modules. In a practical application, the functions may be assigned according to needs to be implemented by different functional modules, that is, the internal structures of the terminal and the gateway are divided into different functional modules, so as to implement all or some of the functions described above. In addition, the terminal, the gateway, and the system for establishing a network connection provided in the foregoing embodiments and the embodiments of the methods for establishing a network connection belong to a same idea, and the method embodiments may serve as a reference for details of a specific implementation process thereof, which are not repeated herein.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. A method for establishing a network connection, wherein the method comprises:
   performing, by a gateway, authentication on a terminal that requests to access a first wireless local area network (WLAN) that corresponds to a first WLAN access point (AP);
   if authentication succeeds, performing, by the gateway, authorization on the terminal, and sending, by the gateway, a first terminal address to the terminal, so that the terminal accesses the first WLAN corresponding to the first WLAN AP, and transmitting, between the terminal and the first WLAN, a packet identified by using the first terminal address;
   obtaining, by the gateway, from an initial service network, a terminal address that is assigned to the terminal to access the initial service network;
   establishing, by the gateway, a user plane connection to the terminal, wherein the terminal accesses the first WLAN;
   receiving, by the gateway, by using the established user plane connection, a connection selection request sent by the terminal, wherein the connection selection request comprises connection selection information;
   when the terminal disconnects from the first WLAN corresponding to a first WLAN AP, and re-chooses to access a second WLAN corresponding to a second WLAN AP, performing, by the gateway, authentication on the terminal;
   if authentication succeeds, performing, by the gateway, authorization on the terminal, and sending, by the gateway, a second terminal address to the terminal, so that the terminal accesses the second WLAN corresponding to the second WLAN AP, and transmitting, between the terminal and the second WLAN, a packet identified by using the second terminal address;
   determining, by the gateway, according to the connection selection information in the connection selection request, a service network selected by the terminal; and
   establishing, by the gateway, a connection between the terminal and the service network selected by the terminal.

2. The method according to claim 1, after the sending a first terminal address to the terminal, further comprising:
   transmitting, by the gateway and between the terminal and the initial service network, a packet identified by using the first terminal address and a packet identified by using the terminal address for accessing the initial service network.

3. The method according to claim 1, after the establishing a connection between the terminal and the service network selected by the terminal, further comprising:
   assigning, by the gateway, to the terminal, a terminal address for accessing the service network selected by the terminal; and
   transmitting, by the gateway and between the terminal and the service network selected by the terminal, a packet identified by using the first terminal address and a packet identified by using the terminal address for accessing the service network selected by the terminal.

4. The method according to claim 1, after the determining, according to the connection selection information in the connection selection request, a service network selected by the terminal, further comprising:
   determining, by the gateway, according to subscription information of the terminal or a network configuration, whether to accept that the terminal is to be connected to the service network; and
   if it is accepted that the terminal is to be connected to the service network, performing, by the gateway, the step of establishing a connection between the terminal and the service network selected by the terminal.

5. A gateway, wherein the gateway comprises a processor and a receiver, wherein:
   the processor is configured to establish a user plane connection to a terminal, wherein the terminal accesses a first wireless local area network (WLAN);
   the receiver is configured to receive, by using the established user plane connection, a connection selection request sent by the terminal, wherein the connection selection request comprises connection selection information;
   the processor is further configured to determine, according to the connection selection information in the connection selection request, a service network selected by the terminal; and establish a connection between the terminal and the service network selected by the terminal,
   wherein the gateway further comprises a transmitter, wherein:
   the processor is configured to perform authentication on the terminal that requests to access the first WLAN that corresponds to a first WLAN access point (AP), when the authentication succeeds, perform authorization on the terminal;
   the transmitter is configured to send a first terminal address to the terminal, so that the terminal accesses the first WLAN corresponding to the first WLAN AP; and transmit, between the terminal and the first WLAN, a packet identified by using the first terminal address;
   the processor is configured to when the terminal disconnects from the first WLAN corresponding to a first WLAN AP, and re-chooses to access a second WLAN corresponding to a second WLAN AP, perform authentication on the terminal, when the authentication succeeds, perform authorization on the terminal;
   the transmitter is configured to send a second terminal address to the terminal, so that the terminal accesses the second WLAN corresponding to the second WLAN AP, and transmit, between the terminal and the second WLAN, a packet identified by using the second terminal address; and
   the processor is further configured to obtain, from an initial service network, a terminal address that is assigned to the terminal to access the initial service network.

6. The gateway according to claim 5, wherein the transmitter is further configured to transmit, between the terminal and the initial service network, a packet identified by using the first terminal address and a packet identified by using the terminal address for accessing the initial service network.

7. The gateway according to claim 5, wherein
the processor is further configured to assign, to the terminal, a terminal address for accessing the service network selected by the terminal; and
the transmitter is configured to transmit, between the terminal and the service network selected by the terminal, a packet identified by using the first terminal address and a packet identified by using the terminal address for accessing the service network selected by the terminal.

8. The gateway according to claim 5, wherein the processor is further configured to determine, according to subscription information of the terminal or a network configuration, whether to accept that the terminal is to be connected to the service network, and when it is accepted that the terminal is to be connected to the service network, perform the step of establishing a connection between the terminal and the service network selected by the terminal.

9. The gateway according to claim 5, wherein the transmitter is configured to send, to the terminal by using the established user plane connection, connection information that comprises selectable connection selection information, and the receiver is configured to receive, by using the established user plane connection, the connection selection request sent by the terminal according to the connection information; or
the receiver is configured to receive, by using the established user plane connection, the connection selection request sent by the terminal according to preconfigured connection selection information.

10. A terminal, wherein the terminal comprises a processor, a receiver and a transmitter, wherein:
the processor is configured to access a first wireless local area network (WLAN), establish a user plane connection to a gateway;
the transmitter is configured to send, by using the established user plane connection, a connection selection request to the gateway, wherein the connection selection request comprises connection selection information; and
the processor is further configured to establish, by using the gateway, a connection to a service network corresponding to the connection selection information in the connection selection request,
wherein the processor is further configured to select a first wireless local area network (WLAN) access point (AP), establish an association with the first WLAN AP, and request, from the gateway, to access the first WLAN corresponding to the first WLAN AP;
the receiver is configured to after the gateway successfully performs authentication and authorization, receive a first terminal address sent by the gateway, wherein
the processor is configured to access, by using the associated first WLAN AP, the first WLAN corresponding to the first WLAN AP;
the transmitter is configured to transmit, to the first WLAN, a packet identified by using the first terminal address;
when the terminal disconnects from the first WLAN corresponding to the first WLAN AP, the processor is further configured to select a second WLAN AP, establish an association with the second WLAN AP, and request, from the gateway, to access a second WLAN corresponding to the second WLAN AP;
the receiver is configured to after the gateway successfully performs authentication and authorization, receive a second terminal address sent by the gateway;
the processor is further configured to access, by using the associated second WLAN AP, the second WLAN corresponding to the second WLAN AP; and
the transmitter is further configured to transmit, to the second WLAN, a packet identified by using the second terminal address.

11. The terminal according to claim 10, wherein:
the receiver is configured to receive connection information that is sent by the gateway by using the established user plane connection and that comprises selectable connection selection information;
the processor is configured to display the received connection information on a user interface, and obtain connection selection information selected by a user by using the user interface; and
the transmitter is configured to send, to the gateway by using the established user plane connection, the connection selection request that comprises the connection selection information selected by the user.

12. The terminal according to claim 10, wherein:
the processor is configured to obtain preconfigured connection selection information by using a user interface; and
the transmitter is configured to send, to the gateway by using the established user plane connection, the connection selection request that comprises the preconfigured connection selection information.

* * * * *